United States Patent
Xiao et al.

(10) Patent No.: US 12,446,772 B2
(45) Date of Patent: Oct. 21, 2025

(54) METHODS AND SYSTEM TO IDENTIFY POSITION, ROTATION, AND TILT OF A CONTACT LENS ON AN EYE

(71) Applicant: Wavefront Dynamics, Inc., Albuquerque, NM (US)

(72) Inventors: Xifeng Xiao, Albuquerque, NM (US); Daniel R. Neal, Tijeras, NM (US); Jeff Kolberg, Laguna Beach, CA (US); Ron Rammage, Tijeras, NM (US); Phillip Riera, Albuquerque, NM (US); R. James Copland, Albuquerque, NM (US); Matthew Haugo, Aliso Viejo, CA (US)

(73) Assignee: WaveFront Dynamics, Inc., Albuquerque, NM (US)

( * ) Notice: Subject to any disclaimer, the term of this patent is extended or adjusted under 35 U.S.C. 154(b) by 538 days.

(21) Appl. No.: 17/975,007

(22) Filed: Oct. 27, 2022

(65) Prior Publication Data
US 2023/0133703 A1    May 4, 2023

Related U.S. Application Data

(60) Provisional application No. 63/402,351, filed on Aug. 30, 2022, provisional application No. 63/274,664, filed on Nov. 2, 2021.

(51) Int. Cl.
*A61B 3/10* (2006.01)
*A61B 3/14* (2006.01)
*A61B 90/00* (2016.01)
*A61B 90/30* (2016.01)

(52) U.S. Cl.
CPC .............. *A61B 3/1015* (2013.01); *A61B 3/14* (2013.01); *A61B 2090/306* (2016.02); *A61B 2090/3937* (2016.02)

(58) Field of Classification Search
CPC ... A61B 3/1015; A61B 3/14; A61B 2090/306; A61B 2090/3937; A61B 2090/395; G02C 7/021; G02C 7/047; G02C 7/048; G02C 2202/22
See application file for complete search history.

(56) References Cited

U.S. PATENT DOCUMENTS

| | | | |
|---|---|---|---|
| 8,636,357 B2 | 1/2014 | Chehab |
| 9,207,466 B2 | 12/2015 | Wildsmith |
| 9,664,923 B2 | 5/2017 | Wildsmith |
| 10,219,945 B2 | 3/2019 | Scott |
| 10,488,675 B2 | 11/2019 | Wildsmith |

(Continued)

*Primary Examiner* — Jack Dinh
(74) *Attorney, Agent, or Firm* — Quinn IP Law

(57) ABSTRACT

This invention comprises a combined optical wavefront aberrometer and topographer system that is used in conjunction with a contact lens that has a plurality of fiducial marks disposed on the lens. The fiducial marks are located radially inside of the undilated pupil's diameter. The optical imaging capacity of the aberrometer is used to measure and monitor any misalignments of the contact lens's position (XY decentration) and/or rotation. Image analysis algorithms are used to track the positions of the fiducial marks, and, hence, the amount of geometric misalignment of the contact lens can be calculated. The fiducial marks can comprise micro ink spots, or depressions in the surface of the contact lens (e.g., divots, dimples, pits), or other small surface features, including raised bumps, which can help to stabilize motions of the contact lens on the eye.

2 Claims, 40 Drawing Sheets

Customized Contact Lens Process Flow Chart:

(56) References Cited

U.S. PATENT DOCUMENTS

| | | |
|---|---|---|
| 11,076,990 B2 | 8/2021 | Lee |
| 2017/0219845 A1 | 8/2017 | Wildsmith |
| 2020/0292847 A1 | 9/2020 | Wildsmith |

Wavefront Image
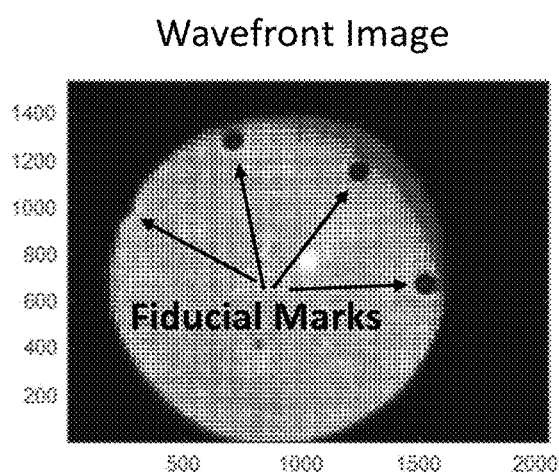
Visible IRIS Image
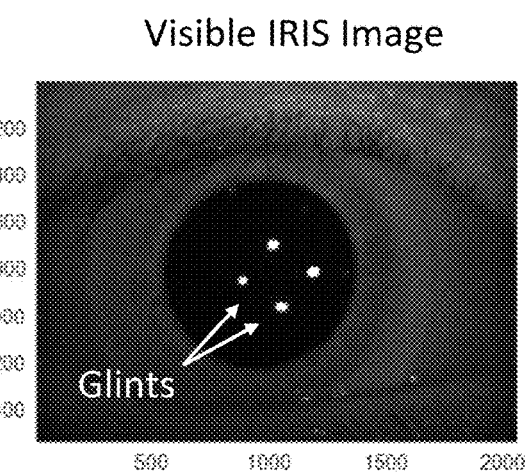
FIG. 2A
FIG. 2B

IRIS Visual Image     WFS Image

Decentered Contact Lens

Mis-rotated Contact Lens

Realistic Misalignments

Vertex Calibration:

METHODS AND SYSTEM TO IDENTIFY POSITION, ROTATION, AND TILT OF A CONTACT LENS ON AN EYE

CROSS-REFERENCE TO RELATED APPLICATIONS

This application claims the benefit of U.S. Provisional Application Ser. No. 63/274,664 filed Nov. 2, 2021, which is incorporated herein by reference in its entirety. This application also claims the benefit of U.S. Provisional Application Ser. No. 63/402,351, filed Aug. 30, 2022, which is herein incorporated herein by reference in its entirety.

BACKGROUND

Keratoconus, pellucid marginal degeneration, corneal transplants and other cornea abnormalities lead to a distorted cornea. This can restrict the visual acuity and quality of vision of the affected individuals. Currently it is estimated that about 1 in 375 people have keratoconus. Combined with the other conditions, 1-2% of the population suffers from degraded vision that is the result of a distorted cornea.

With the advent of wavefront-driven refractive surgery (Lasik and PRK), for some individuals these imperfections can be measured with a wavefront aberrometer, and the measurements are used to guide the laser's delivery to the cornea. While this technique can be quite effective, refractive surgery is limited to those patients that have a sufficiently large corneal thickness to support the required depth of ablation. Unfortunately, it is usually because of a thin or weak cornea that the aberrations develop. So, the very people that need a wavefront-guided (WFG) approach the most are ineligible for LASIK or PRK.

It has recently become possible to treat these individuals with a customized contact lens (CL) using the same approach. This can successfully correct for the distortion, even with quite strong aberrations. For this to be effective, the CL must be very stable on the eye so that the region on the CL with the wavefront correction patch remains aligned with the pupil. This has led to the use of scleral CLs for this purpose, since these are generally much more stable that cornea rigid gas permeables (RGPs) or soft CLs.

WFG custom CLs are a promising treatment for keratoconus and other medical conditions where high-order wavefront aberrations degrade vision. A WFG correction patch can be implemented on a customized CL to improve the patient's vision.

By nature, a scleral CL rests on the sclera of the eye and not on the cornea. Most of these lenses are designed to vault over the cornea so as not to touch it in any way. Thus, the fit of the scleral lens depends not as much on the corneal shape as it does on the shape of the sclera. Various technologies have been developed to profile the eye, including the sclera, to determine the scleral shape, and hence the fit of the CL. These include stereophotography, Scheimflug profilometry, OCT, and 3D imaging.

A well-fitting CL will sit in a stable position on the eye. The simple approach would be to center the WFG correction ("patch") on a CL. However, this can result in poor vision because a CL is rarely centered properly over the pupil of the eye. A trial CL can be used to measure the XY positioning, tilt, and rotation of the CL with a wavefront correction patch.

CLs are inherently transparent, so it can be difficult to get good images of them when sitting on the eye. FIGS. 1A and 1B illustrate the difficulty. In this example, the edges of the CL can be barely seen. In addition, the CL might not be centered over the pupil of the eye. However, there is no visible feature that shows a misaligned rotation (mis-rotation) angle of the CL. So, it is difficult to correctly orient a wavefront-corrected lens on the eye if it has no visible features.

Since a scleral lens sits on the sclera, there is nothing currently available that registers the CL to the cornea. The sclera is not necessarily concentric with the cornea and a scleral lens is generally tilted (misaligned) with respect to the cornea. The light is collected through the pupil, so a particular alignment is required between the location of the wavefront correction patch on the customized CL and the cornea. This is generally measured using a special diagnostic CL that has one or more fiducial marks disposed on it. The location of these fiducials is determined simultaneously with the wavefront measurement and the results are used to determine the optimal location to place the wavefront correction patch on the CL. The CL can be, for example, a normal CL or a scleral CL.

However, the tilt of the lens is only determined by the scleral shape. Scleral lenses also usually have a fairly deep sag, 5-6 mm, and so the tilt results in a significant XY offset between the pupil and the center of the CL. Thus, the measured position of the wavefront correction patch will not be adequately determined using the CL edge or marks near the edge of the lens. This results in errors in the wavefront correction since the designed correction does not align with the actual aberrations of the eye.

Thus, determining the tilt of a scleral CL is important to achieve optimal wavefront correction. The goal of this invention is to (1) measure the optical wavefront of the eye/CL combination and, nearly simultaneously, to also (2) determine if there are any misalignments of the CL XY position (i.e., mis-centration) and rotation (i.e., tilt, mis-rotation). We propose the use of fiducial marks placed on the CL to solve the problem of misalignment identification and to measure the lens tilt directly with projected light.

BACKGROUND REFERENCES

U.S. Pat. No. 8,636,357 (2014) to Chehab et al. describes "Custom Contact Lenses with Fiducial Markings". Here, fiducial markings are radially located outside of the patient's pupil diameter, so that they don't interfere with the light passing through the pupil and decrease vision quality. This is opposite than what is taught in the present invention, where the fiducials may be radially located inside of the pupil's opening, or near the outer edge of the pupil.

U.S. Pat. No. 10,219,945 (2019) and US 2019/0269551 (2019) to Scott et al. both describe "Laser Fiducials for Axis Alignment in Cataract Surgery". Here, a fiducial mark is created on an internal anatomical structure of the eye of a patient with a surgical laser. A toric artificial intraocular lens (IOL) is positioned so that a marker of the toric IOL is in a predetermined positional relationship relative to the fiducial. This positioning aligns the toric IOL with the astigmatic (or another axis of the eye). The toric IOL is then implanted in the eye of the patient with high accuracy. This is different than the present invention, where the fiducial marks are created on a CL, rather than being created on an internal anatomical structure of the eye.

U.S. Pat. No. 10,488,675 (2019) to Wildsmith et al. describes "Lens Edge Features for Determining Lens Placement and Alignment". Here, a CL (having an outer periphery) has two fiducial indicators (i.e., marks) that are located on the outer periphery of the CL. The two fiducial indicators each include at least one recess into, or at least projection extending outwardly, from the lens edge. All of Wildsmith's fiducial markings are radially located far outside of the patient's pupil diameter, so that they don't interfere with the light passing through the pupil and decrease vision quality. This is opposite than what is taught in the present invention, where the fiducials may be located inside of the pupil's outer diameter.

U.S. Pat. No. 11,076,990 (2021) to Lee et al. describes a "System and Method for Ophthalmic Laser Surgery Employing Eye Tracking Without Eye Docking". Here, a scleral ring including fiducial markings placed on an outer periphery of the ring, and a compliant CL, and a fluid tillable CL are all configured to facilitate ultra-short, pulsed laser surgery, while reducing or eliminating eye docking (fixation) requirements. This configuration is opposite than what is taught in the present invention, where the fiducials are located inside of the pupil's outer diameter.

US patent application 2017/0219845 to Wildsmith et al. describes "Methods for Incorporating Lens Features and Lenses Having Such Features". Wildsmith teaches away from the present invention. In particular, Wildsmith says: "Many previously known methods of applying indicia or a marking to a lens surface adversely affects the integrity (and thus fit and comfort) of the optical quality surface. For example, scribing or the like, or applying such markings via a separate process such as ink jet printing, results in a suboptimal quality surface, with divots, raised surfaces or the like." The problem of optical quality of fiducial marks is directly addressed (and solved) in the present invention.

Additional references include U.S. Pat. Nos. 9,207,466; 9,506,837; 9,664,923; 2015/0146171; and 2020/0292847. None of these additional references teach the present invention.

Current State of the Art

A standard way of measuring the XY position and rotation of the CL is to observe fiducial marks on the CL with a slit lamp. Light reflected off the features (e.g., edges of the CL) can appear as small bright or dark spots. It is difficult to design such marks to be observable under all conditions. Slit lamps make identification of fiducial marks possible by using bright white light and by allowing the operator to change the viewing angle into the eye. Cameras can be attached to slit lamps to allow quantitative measurement of how a lens sits on the eye. But the wavefront needs to be measured on a separate instrument (e.g., an aberrometer). This introduces complications in matching data between two different optical systems. Additionally, for the best accuracy purpose, the dynamic measurements for both wavefront and contact lens position help to obtain statistical and hence reliable results.

Methods for physically stabilizing the rotation of the CL on the eye have been developed and used, including weighted ballast designs that place extra CL material at the bottom of the CL, which pulls the CL down into a proper rotational alignment with respect to a vertical axis via gravity. Alternatively, or additionally, fiducial marks on the CL can be helpful to stabilize the CL by creating friction points between the lens and eyelid.

There are various methods for creating fiducial marks (i.e., "fiducials"). These include structural modifications made to the anterior surface of the CL (e.g., dimples, scratches, lines, circles, divots, pits, cylindrical grooves, diffraction gratings, and/or spots of ink or other light-absorbing material, raised bumps, or combinations of these).

Since it is desirable to make multiple measurements along the same optical path, typically illumination and imaging are obtained using a combined topographer/aberrometer instrument operating at multiple, different wavelengths. In a slit lamp, a bright white light source is often used, however, in a custom optical instrument this would interfere with other functions, such as operation of the fixation target or the wavefront sensor (WFS). Consequently, the iris images are preferably obtained by using near-infrared light, not a bright white light.

For efficient clinical practice, an optical instrument is needed that simultaneously measures the eye's wavefront aberrations and the CL XY position and rotation. If slit lamp visible fiducials are used, sufficient light needs to be reflected from the fiducials into the instrument. This reflected light may form a glint that is detectable in the image. However, it often happens that only a small portion of light reflecting off the fiducial happens to point into the instrument. If the glint on the image is weak, the identifying mark is difficult to see due to the complex and varied background of the eye's iris.

In some cases, the fiducial mark will not be visible as a glint, but it may cast a shadow on the iris. At first appearance, it may seem that shadows would be a good guide for determining CL misalignment. But three-dimensional sketches of the situation reveal that shadow formation onto the iris depends on the location of the light sources, identifying which light source is creating the shadow, the distance to the eye, the radius of curvature of the sclera, and the anterior chamber depth (how far the iris is from the CL). Hence, it is difficult to get a good estimate of CL XY position & rotation from shadows.

Against this background, the present invention was developed.

SUMMARY OF THE INVENTION

This invention comprises a combined optical wavefront aberrometer and topographer system that is used in conjunction with a CL that has a plurality of fiducial marks disposed on the lens. The fiducial marks are located radially inside of the undilated pupil's diameter. The optical imaging capacity of the aberrometer is used to measure and monitor any misalignments of the CL position (XY decentration) and rotation. Image analysis algorithms are used to track the positions of the fiducial marks, and, hence, the amount of geometric misalignment of the CL can be calculated. The fiducial marks can comprise micro ink spots, or depressions in the surface of the CL (e.g., divots, dimples, pits), or other small surface features, including raised bumps, which can help to stabilize motions of the CL on the eye.

BRIEF DESCRIPTION OF THE DRAWINGS

FIG. 2A shows a conventional wavefront raw image of an eye with 4 fiducial marks (dark spots).

FIG. 2B shows a wavefront image of an eye with 4 bright spots (glints).

DETAILED DESCRIPTION OF THE INVENTION

One proposed solution is to place fiducial features (i.e., marks) on the CL that create dark regions (e.g., dark spots) in a wavefront image, and/or glints in the visible Iris image. Bright (reflective) spots can also be used, so long as there is sufficient contrast to be seen. A preferred embodiment is to use "dark" fiducial marks. Note: the "ocular pupil zone" is the area inside of the pupil that is transparent.

Two approaches suggest themselves. One method is to place small spots of opaque ink on the CL, radially inside the pupil, that block light transmission, thereby creating a dark spot. A second method is to create one or more small, recessed dimples on the CL inside, or at the inside edge of, the pupil that scatter light away from the optical instrument (thereby leaving a dark spot). Ideally, the light-diffracting/occluding micro-features are so small that a patient's vision is negligibly affected. The instrument's WFS still receives most of the light, so useful wavefronts and refractions can be accurately determined. The proposed features on the CL should be located inside of the patient's pupil, which is located directly behind the CL.

For the dark region (spots) to be distinct, it needs to block the light collected from four or more lenslets in the WFS. If the WFS has a coarse lenslet pitch, the size of the diverting feature must be larger. So, this method ideally works best in conjunction with using a high-resolution WFS. FIG. 2A shows a wavefront image where each lenslet corresponds to a region on the CL that is about 0.1 mm square. Four small dimples on the surface of the CL create four dark spots. The image of the right (FIG. 2B) is a conventional visible Iris image. The four bright spots in FIG. 2B are glints from four illuminating LEDs. The instrument that took these images used 840 nm light for making the wavefront images, and 940 nm light for making the visible Iris images.

Figure 3:
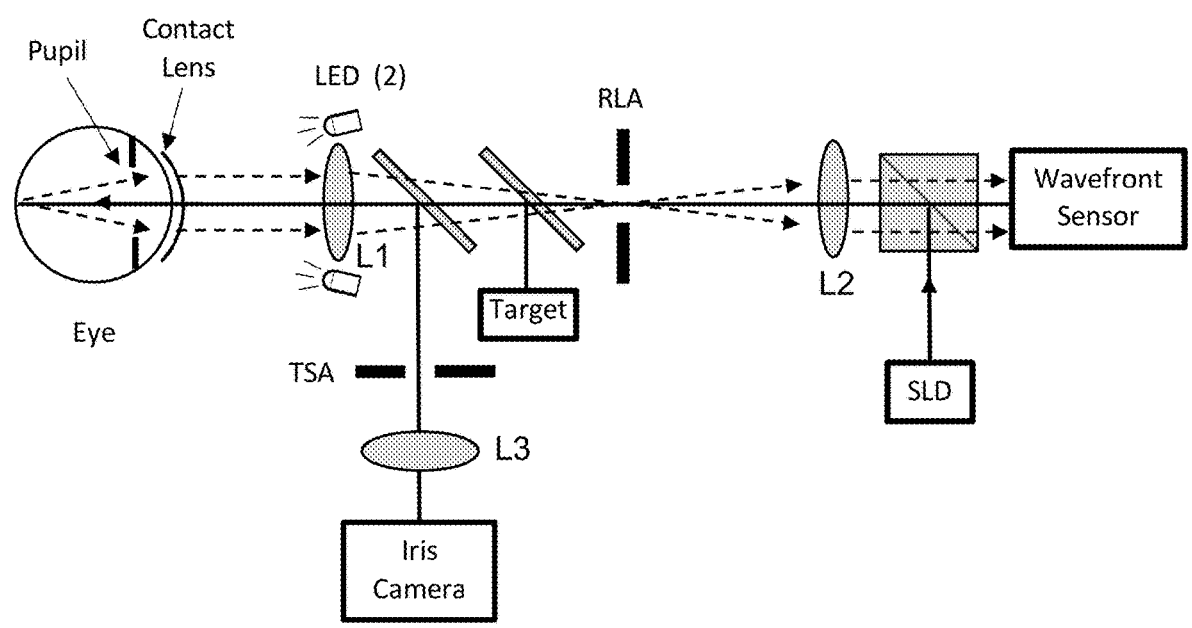
FIG. 3 shows a schematic of an optical system for performing wavefront analysis of an eye, according to the present invention.

FIG. 3 is a schematic example of a combined optical system for making the images, according to the present invention. A patient gazes into the instrument and views an illuminated target. Then, light leaves the Supra-Luminescent LED (SLD), reflects off a beam splitting cube, and travels into the eye. A small portion of light then scatters off the retina and retro-illuminates the pupil of the eye. That light leaves the eye in a semi-collimated beam. The beam goes back into the instrument, passes through a range limiting aperture (RLA) and then into the WFS. Any light rays that are not semi-collimated when they enter the instrument are blocked by the RLA.

The optical instrument depicted in FIG. 3 measures the wavefront with an 840 nm SLD as the light source; and the coatings on the optics are optimized to direct that wavelength to the WFS. The conventional images use 780 nm and 940 nm light, which the optical elements send to the visible iris camera. Additionally, the visual target is viewed with visible light from 400 to 600 nm (emitted from LEDs on either side of the front lens L1). Other wavelength division schemes are possible as well.

Fiducial Marks

A spherical end mill can micro-machine spherically shaped dimples in the surface of a CL. Alternatively, a focused laser (e.g., a femtosecond (FS) laser or other ultra-short pulse laser) can be used to create holes or melted spots via localized laser ablation. Alternatively, or additionally, a FS laser can be used to locally change the Index of Refraction of the CL material, which creates a divergence in the 3-D rays passing through the fiducial mark. The marks can comprise recessed dimples, scratches, divots, pits, holes, cylindrical grooves, lines, circles, diffraction gratings, and/or spots of ink or other light-absorbing material, or protruding bumps, or combinations of these.

Figure 4:
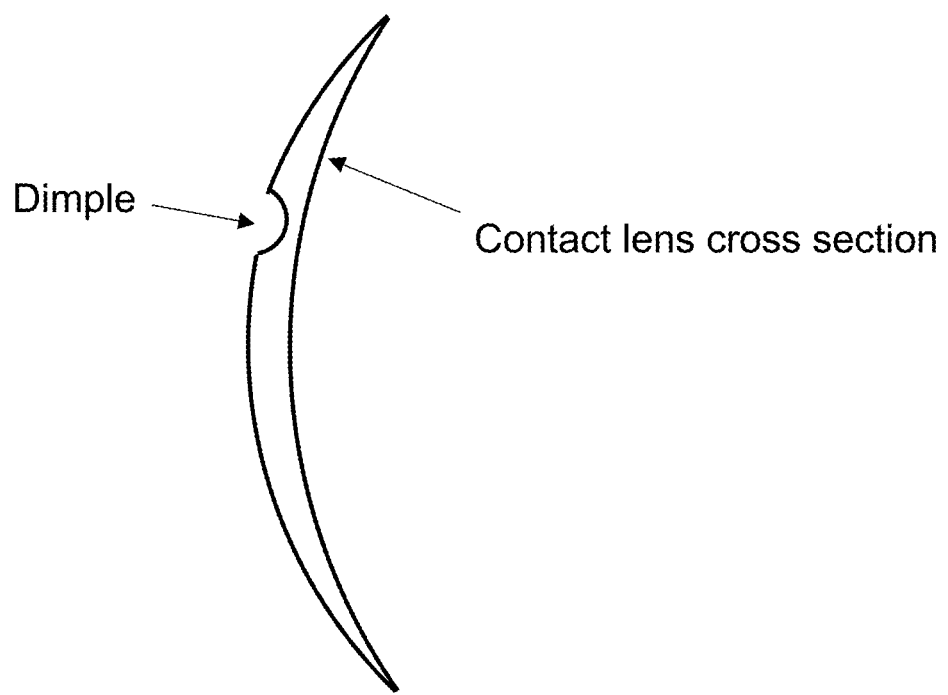
FIG. 4 shows a generic dimple (fiducial mark) in a cross-section of the CL, according to the present invention.

FIG. 4 shows an example of such a spherical dimple. For purpose of illustration, the size of the dimple appears larger in proportion to the actual CL than it would likely be created in a real CL. The dimples can have a radius of curvature ranging from 0.05 to 0.25 mm and a depth that is less than the thickness of the CL (which is typically about 0.16 mm). For purpose of illustration, the CL cross-section is represented as being much simpler than it actually is (in reality). When corrected for wavefront aberrations, the anterior surface of the CL typically has a complex-shaped thickness profile across the lens that corrects for aberrations of the eye.

One advantage of using a spherical end mill to machine the dimples is that the dimples can be created while the lens is still held on the chuck that held the CL while the wavefront-corrected features are being cut. This can ensure perfect registration of a wavefront correction "patch" to the fiducial marks.

Light that is traveling out from the eye will encounter the dimple and be diverted (refracted) out of the path that leads to the WFS, thereby leaving a dark spot.

Figure 5:
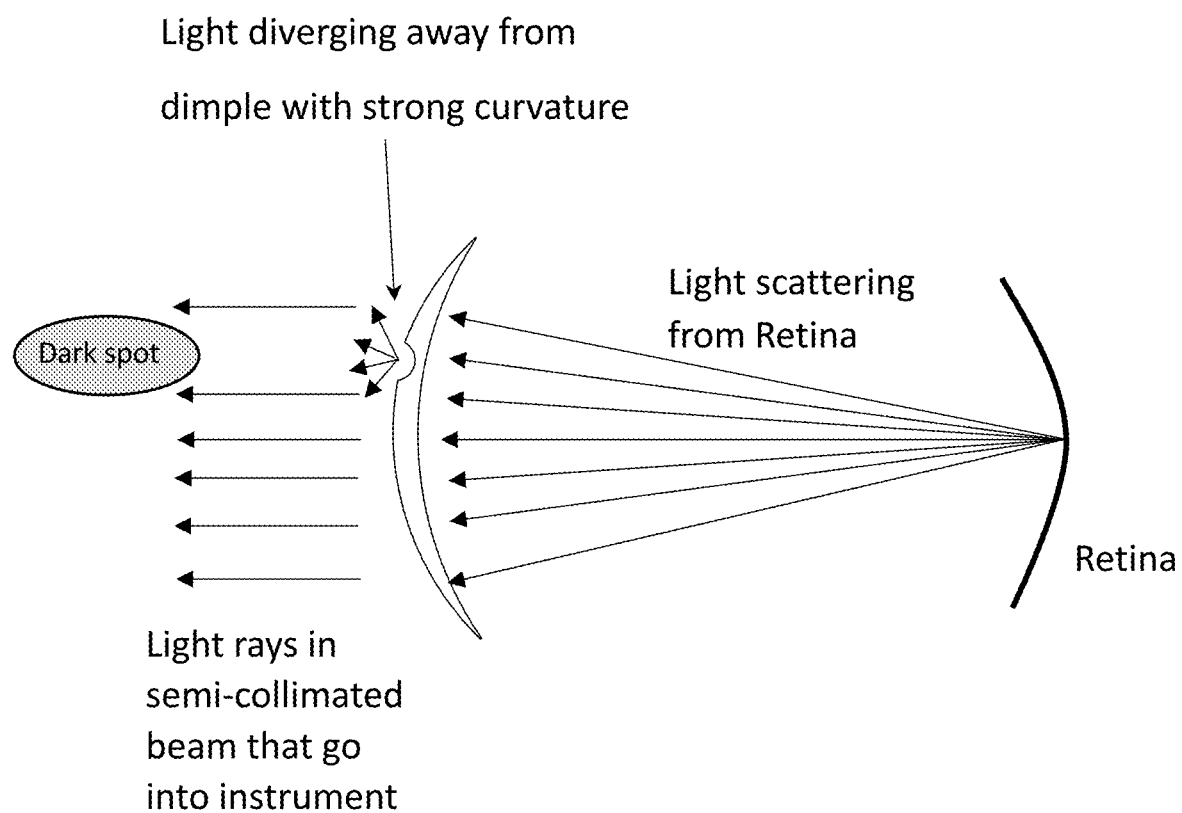
FIG. 5 shows a dimple with strong curvature, in a cross-section of the CL, and dark spot (fiducial mark) formation using light rays, according to the present invention.

In FIG. 5, the dimple feature is shown with a highly curved, convex spherical surface, so that light diffracts strongly away from the instrument's optical axis. In that situation, very little light from that region will even make it into first lens (L1) of the instrument, and, hence, will make a dark spot.

Figure 6A:
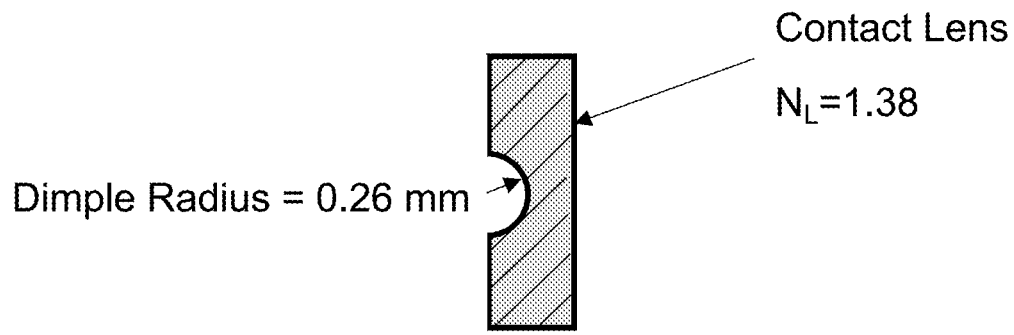
FIG. 6A shows a simple model of a dimple with a strong curvature, in a cross-section of the CL, according to the present invention.
Figure 6B:
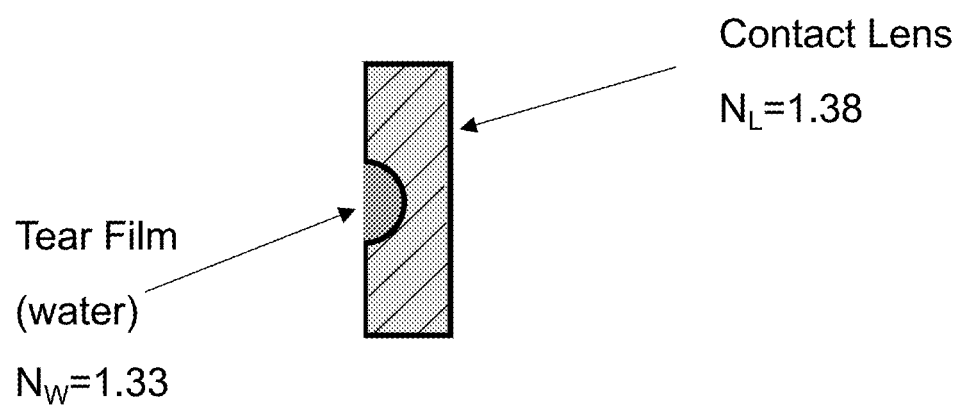
FIG. 6B shows a dimple with a strong curvature that is filled with a tear film (water) in a cross-section of the CL, according to the present invention.

The intensity of light diffracted from the dimple can be estimated by calculating the focal length of the lens feature created by the dimple. FIGS. 6A and 6B show a typical dimple geometry. On the left, a typical dimple may have a radius of 0.26 mm and the CL material may have a refractive index of about $N_L$ of ~1.38. The focal length, f, of the dimple is calculated by the formula $f=R/(n-1)$, which works out to 0.684 mm, which is equivalent to 1462 diopters. On the eye, typically the dimple will fill in with a tear film that has an index of refraction of about 1.33. In this second case (See FIG. 6B), the formula for the lens focal length becomes $f=R/(N_L-N_W)$, where $N_W$ is the refractive index of water. That works out to a focal length f=5.20 mm, which is equivalent to 192 diopters. The optical design of a typical wavefront aberrometer allows about an 8 diopter range to reach the WFS to cover almost the entire demographic of patient's astigmatism. Other light rays are rejected, so very little light diverging from a 192 diopter cone will reach the WFS (thereby leaving a dark spot on the WFS).

Figure 7A:
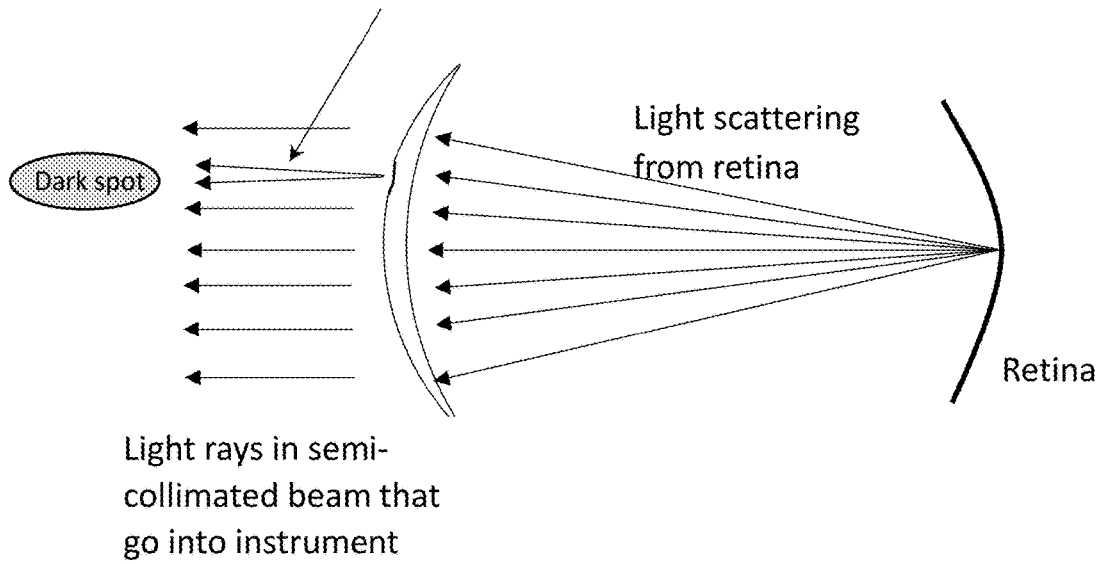
FIG. 7A shows a cross-section of the CL, with a dimple that has a weak curvature, according to the present invention.

FIG. 7A shows a different situation. In this example, the dimple is shallow and has a weak curvature (corresponding to a shallow pit). So, most light passing through the dimple will only be slightly refracted. Hence, most of the light does enter the instrument's sensor. In this case, the rays emanating from the shallow dimple will be blocked by the Range Limiting Aperture (RLA) on the WFS path, so the desired dark spot is created. FIG. 7A is scaled with a 14 mm diameter CL, a 12 mm diameter limbus, and a 6 mm diameter pupil. Hence, the longest leg of the fiducial triangle is about 4 mm.

Figure 7B:
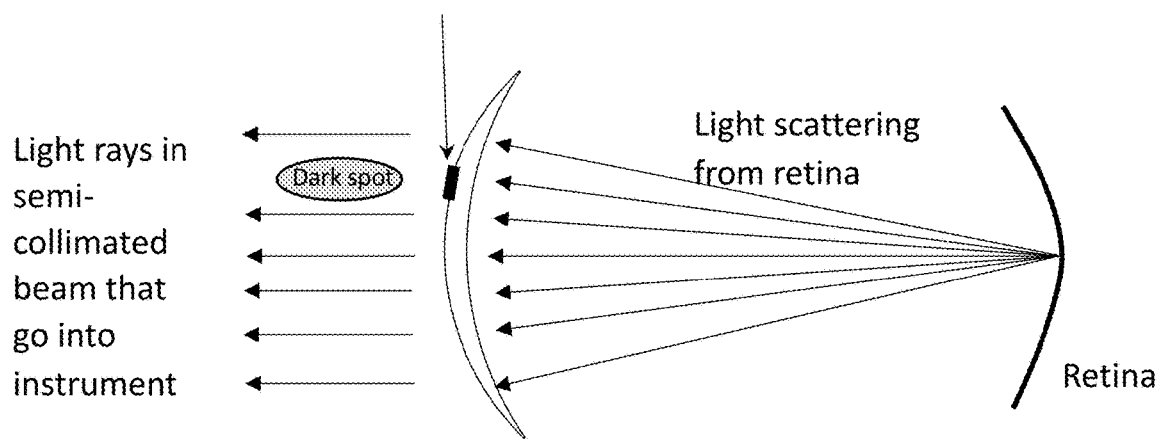
FIG. 7B shows a cross-section of the CL, with a fiducial feature comprising an opaque ink spot, according to the present invention. The opaque ink spot blocks light rays, thereby creating a dark spot.

FIG. 7B shows a cross-section of the CL, with a fiducial feature comprising an opaque ink spot, according to the present invention. The opaque ink spot completely blocks light rays, thereby creating a dark spot.

Ideally, the fiducial marks are positioned in a geometrical pattern that can uniquely define the CL position and rotation angle. A convenient pattern is that the three dots have equal distance to the CL center and two at horizontal direction (0 and 180 degrees) and the third one at 90 or 270 degrees. Patterns with more than 3 equidistant spots can also be used.

The outer extent (size) of the fiducial spot pattern must fit inside the pupil to be useful. Normal pupil sizes range from 2 to 4 mm in bright lighting, and between 4 and 8 mm in dark conditions. Consequently, a pattern of marks that has about a 4 mm diameter will typically be visible in the wavefront image when measurements are made in a dark room with a dim target in the instrument. Dilating eye drops can also be used to achieve dilation in normal lighting, so that the fiducial features can be more easily seen.

Figure 1A:
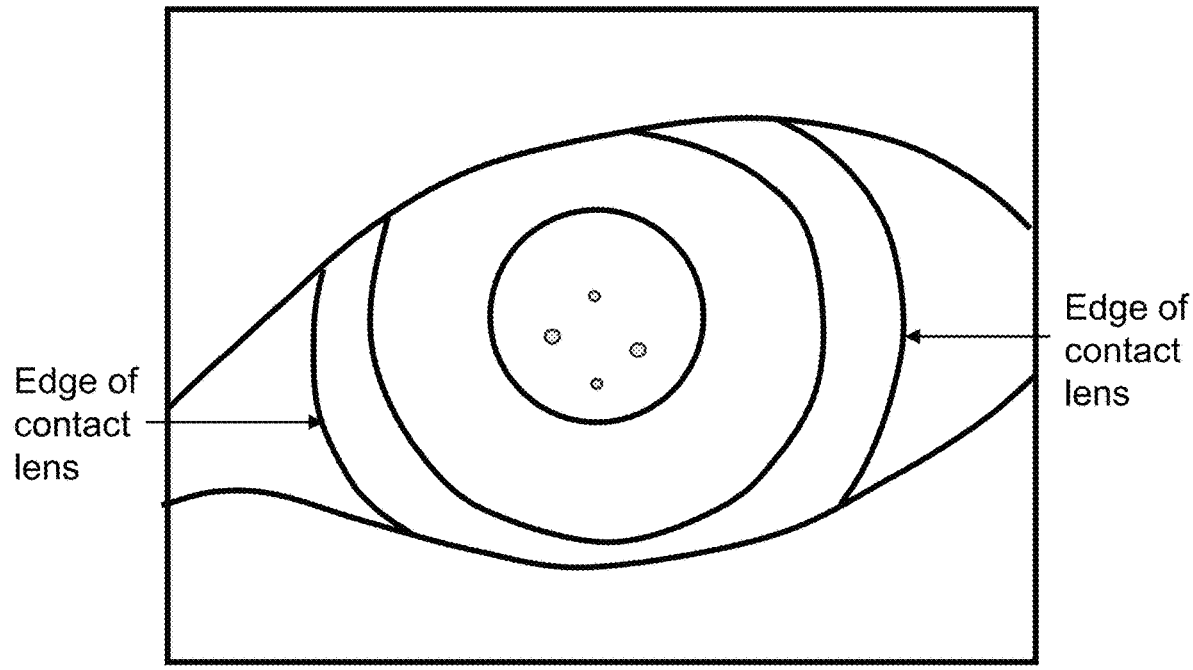
FIGS. 1A and 1B show a visual image of an eye with a CL.
Figure 1B:
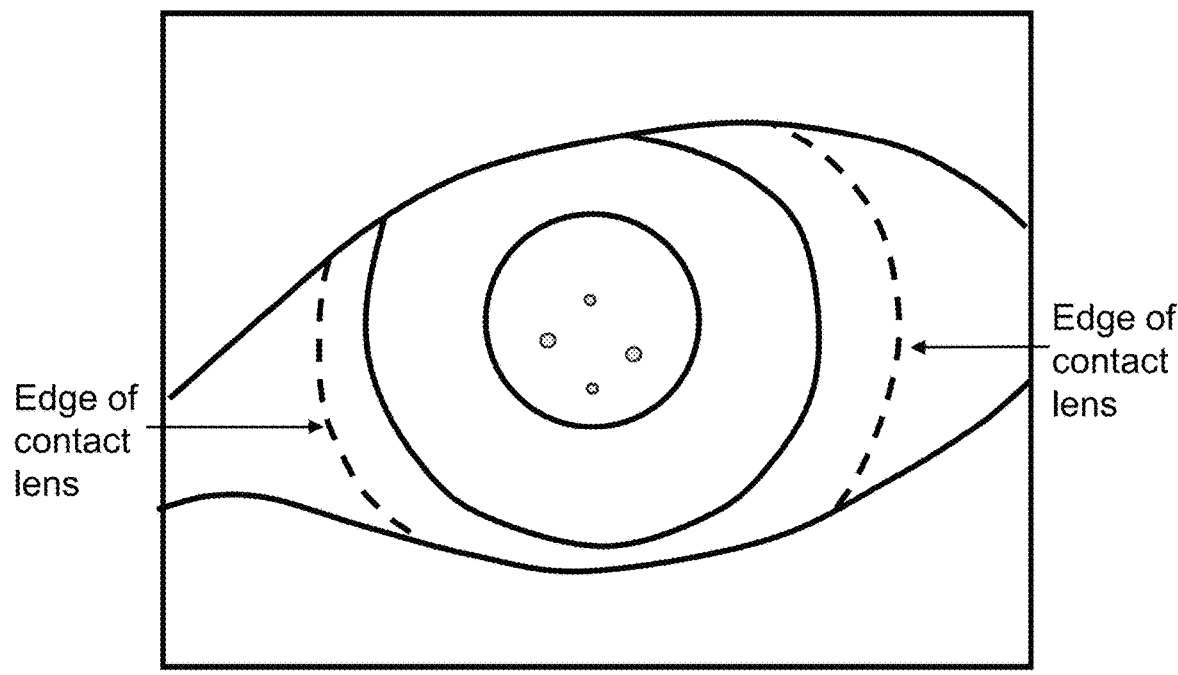
Figure 8:
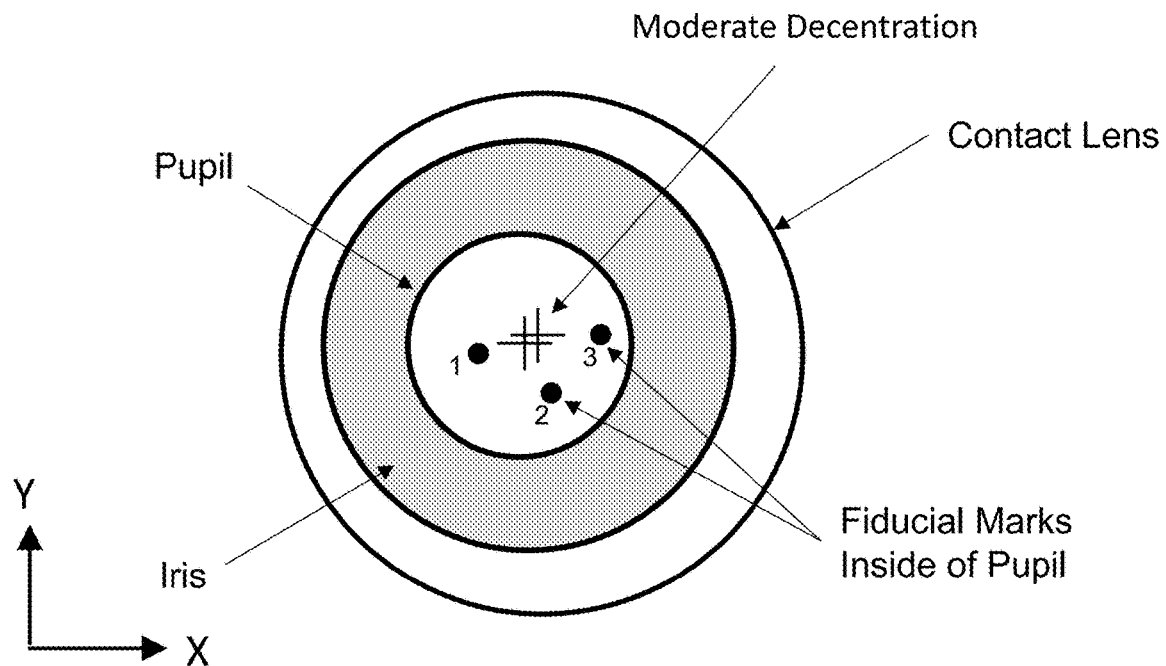
FIG. 8 shows a schematic front view of an eye covered with a CL that has three fiducial marks, and the CL is reasonably well centered over the pupil, according to the present invention. Three dark spots appear inside the pupil's diameter (#1, #2, #3).

FIG. 8 below shows an example of a useful fiducial spot pattern on a CL. The pattern's geometry roughly matches the proportions appearing in FIGS. 1A and 1B, with the CL, iris, and pupil all moderately decentered with respect to each other. The outer circle represents the outside edge of the CL, and the three black dots (#1, #2, #3), are fiducials marks that are centered on the CL and are located inside of the pupil. The gray annulus represents the iris of the eye, and the white inner disc is the pupil of the eye. The white appearance of the pupil results because the pupil is back-illuminated (retro-illuminated) by light scattering off the retina and back towards the cornea.

Figure 9:
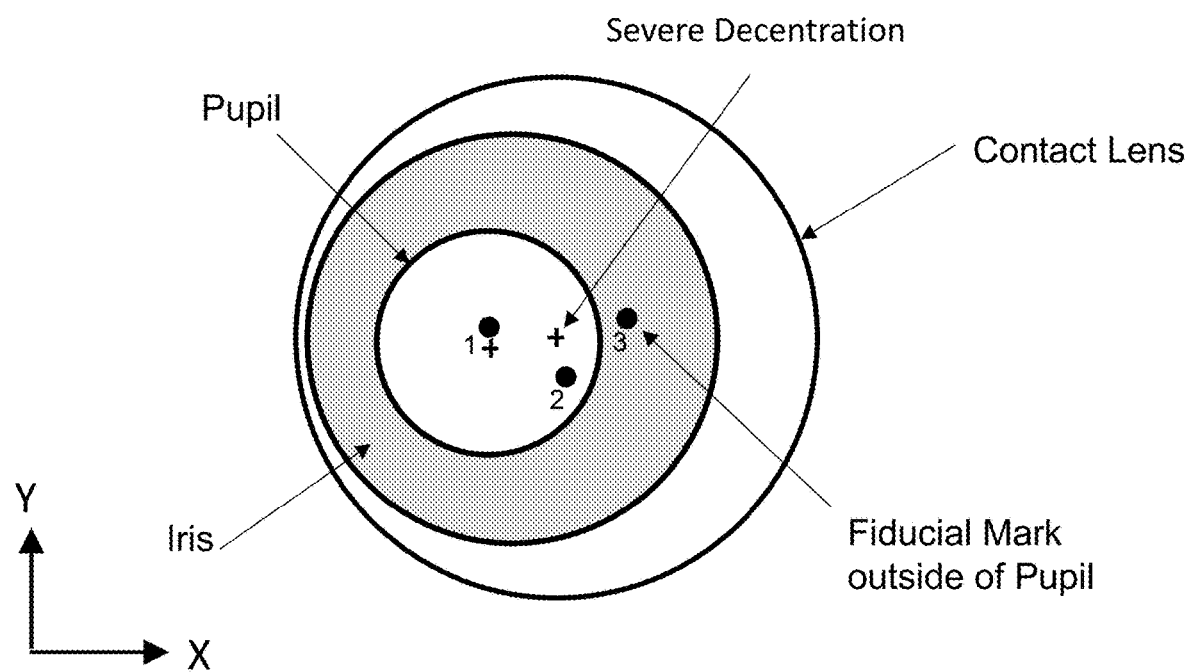
FIG. 9 shows a schematic front view of an eye covered with a CL that has three fiducial marks, and the CL is strongly de-centered over the pupil. Only two dark spots appear inside the pupil's diameter (#1, #2).

FIG. 9 below shows a different example where the CL is now strongly decentered and only two spots are located inside the pupil (#1, #2), and the third spot (#3) falls outside of the pupil. This means that the third spot cannot be seen by the wavefront imaging camera(s). In this configuration, the contact len's position and rotation cannot be uniquely determined (at least 3 spots are required for uniqueness).

Figures 10A, 10B:
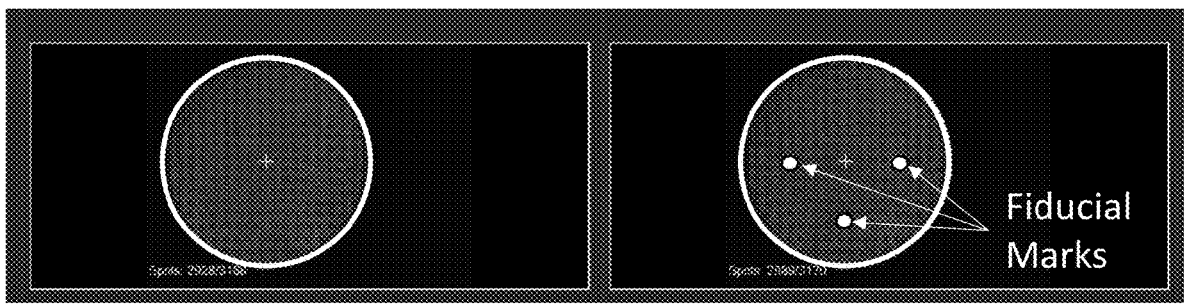
FIG. 10A shows a wavefront image of an eye, with no dark spots.
FIG. 10B shows a wavefront front image of an eye, with three dark fiducial spots (illustrated as white spots in this drawing to make them visible).

FIG. 10A shows a wavefront image of an eye, with no dark spots.

FIG. 10B shows a wavefront front image of an eye, with three dark fiducial spots (illustrated as white spots in this drawing to make them visible). The CL's position and rotation can now be uniquely determined using simple geometrical relationships between the three spots. Note that the pattern being matched is no longer the same triangle as before. A variety of well-known geometric correlation algorithms are readily available that adapt to the variety of ways a spot pattern may appear, with, for example, three, four, or five spots.

The practicality of using darks spots inside the pupil relies on an assumption that the visual acuity is only minimally affected by regions of dark spots. In principle, this is valid because the spots areas that are being cut into the custom contacts are small. A second reason is that a CL with small fiducials would minimally vary in optical performance with small shifts on the eye.

To test the assumption about visual acuity and dark spots, a WFS image of a typical eye with a CL and with no dark spots was initially analyzed. Then, dark regions were created by artificially editing the images (by adding simulated dark spots) and the wavefront analysis was repeated. FIGS. 10A and 10B below shows the results of this analysis. The left image in FIG. 10A is the original wavefront image, and the image on the right in FIG. 10B is same image with three dark spots artificially created inside the pupil.

Figure 11:
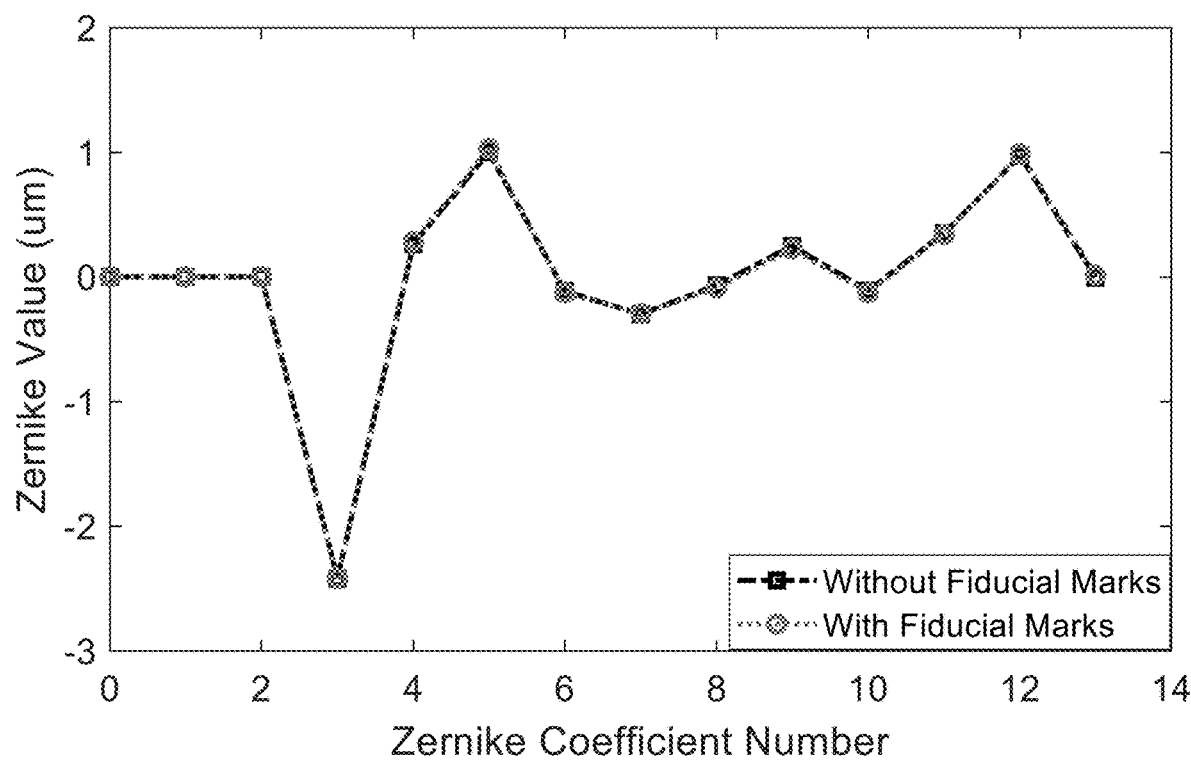
FIG. 11 shows a plot of Zernike Values versus Zernike Coefficient Number, for a contact lens with, and without, fiducial marks. The Zernike coefficients from the wavefront analysis program indicates the amount of wavefront aberrations of the eye plus a contact lens.

FIG. 11 shows computer wavefront analysis results (Zernike polynomial coefficients) for the two different cases, i.e., (1) the un-altered CL on the left side without fiducial masks (see FIG. 10A), and (2) the simulated CL on the right side with three artificial spots (see FIG. 10B Note that the magnitude of aberrations are nearly identical for the two different cases Hence, the presence of the three spots would not be expected to affect the visual acuity very much, if at all.

An extensive series of numerical simulations were performed using a large variety of spot and pupil sizes. We found that (1) the WFS still receives more than 97% of the light (when compared to no spots), and that (2) useful wavefronts and refractions can be still determined.

A potential item of concern is that fiducials located inside the pupil could degrade vision. It is a well-known phenomenon that small obscurations on the outside of camera lenses have virtually no effect on the image quality (although dust specks inside camera lenses can cause annoying black spots on images). Fiducials on a contact lens inside of the pupil's diameter are more likely to behave like obscurations on the outside of a camera lens. But obscurations block light completely, whereas our fiducials may transmit some light. This brings up the possibility that the fiducials could cause undesirable effects, like glare and halos, that have been known to occur in LASIK surgery.

Figure 12:
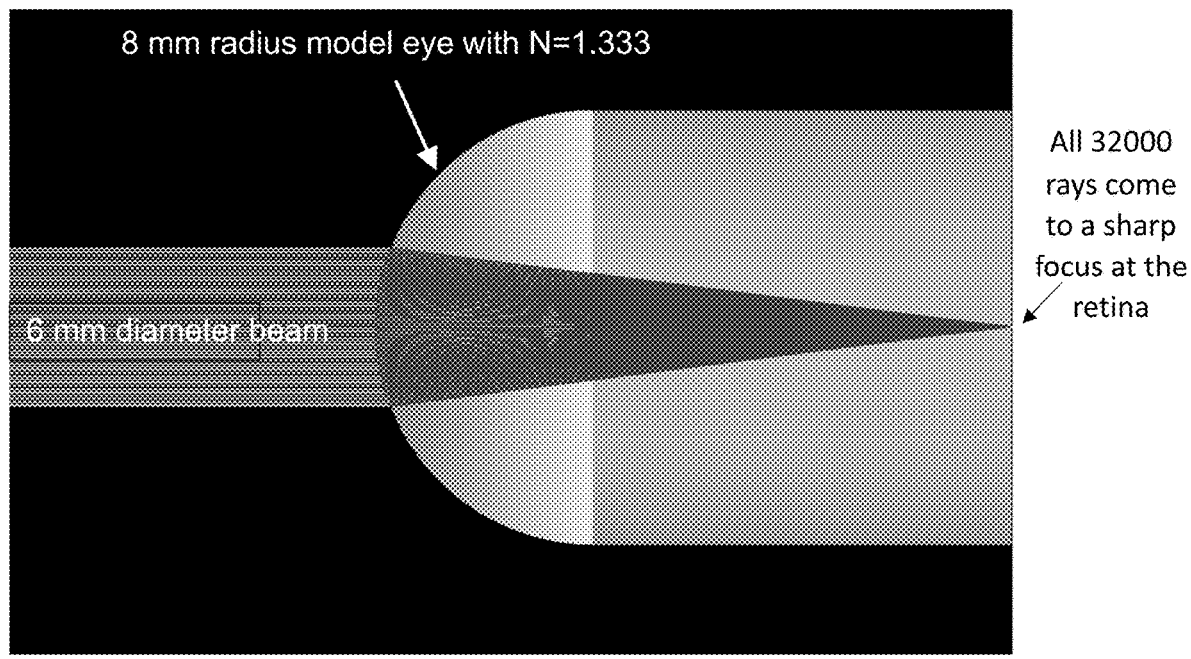
FIG. 12 shows a computer simulation (3-D raytracing) of a 6 mm diameter beam shining into a model eye that has an 8 mm radius. All of the rays converge to a sharp focus on the back of the retina, as expected.
Figure 13:
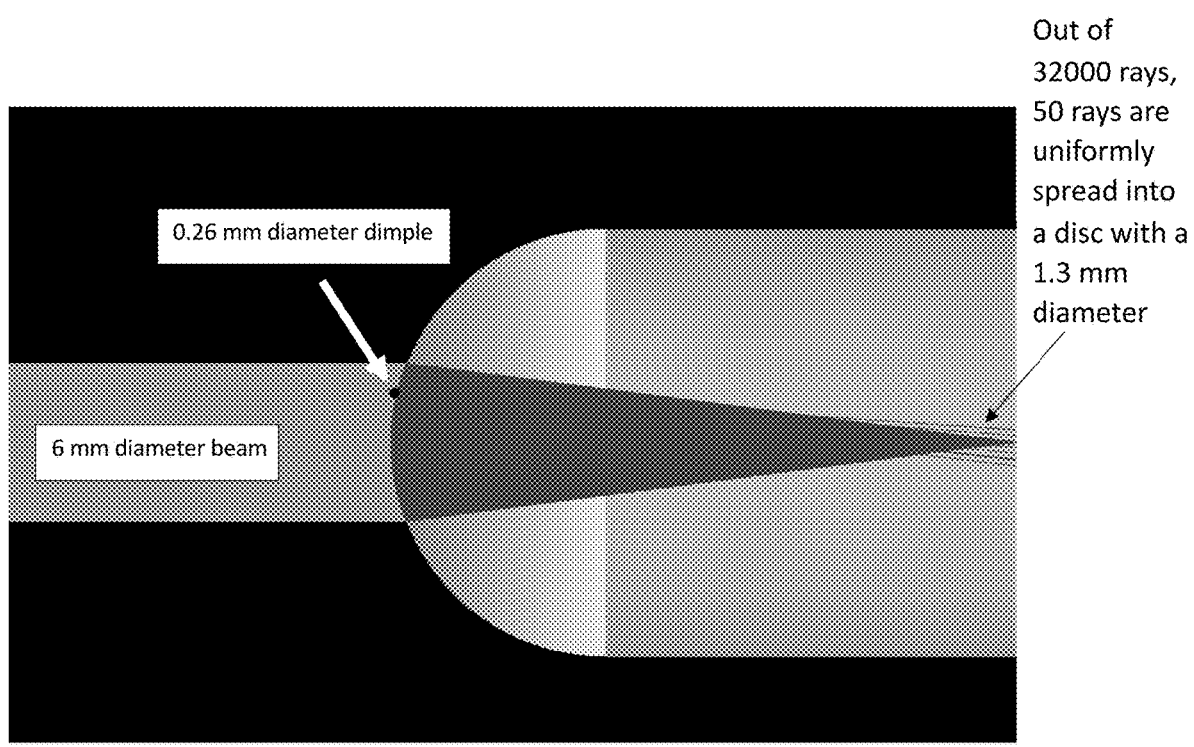
FIG. 13 shows a computer simulation (3-D raytracing) of a 6 mm diameter beam shining into a model eye that has an 8 mm radius, which also has a dimple added to the CL. Most of the rays converge to a sharp focus on the retina. However, a small fraction of rays do not.

FIGS. 12 and 13 show a simplified 3-D model eye that has been 3-D raytraced with, and without, such a tear film-filled dimple. In FIG. 12, a 6 mm diameter beam shines into a model eye that has an 8 mm radius and a refractive index of 1.333. All the rays, (32,000 in this example) come to sharp focus at the back of the retina at 23.4 mm, with about 99.9% of the rays contained within a disc of diameter=0.05 mm.

In FIG. 13, a spherical dimple has been added to the 3D model eye, with the configuration as described for FIG. 6B, with a radius of 0.26 mm, a diameter of 0.26 mm and a tear film filling in the dimple. When a tear film fills in the dimple, a tiny micro-lens with a power of 192 diopters is created. The dimple is offset radially 2 mm away from central optical axis of the eye. The ray traces show light going through the dimple spreads out uniformly into a disc 1.4 mm diameter with very low power, (i.e., only 50 rays out of 32,000 rays are captured). Hence, it is unlikely that such a distribution will disturb a patient's vision. This also matches clinical observations from optometrists that small marks/defects inside the pupil do not affect vision. Essentially, patient's "see around" the fiducials and don't notice them.

Figure 14:
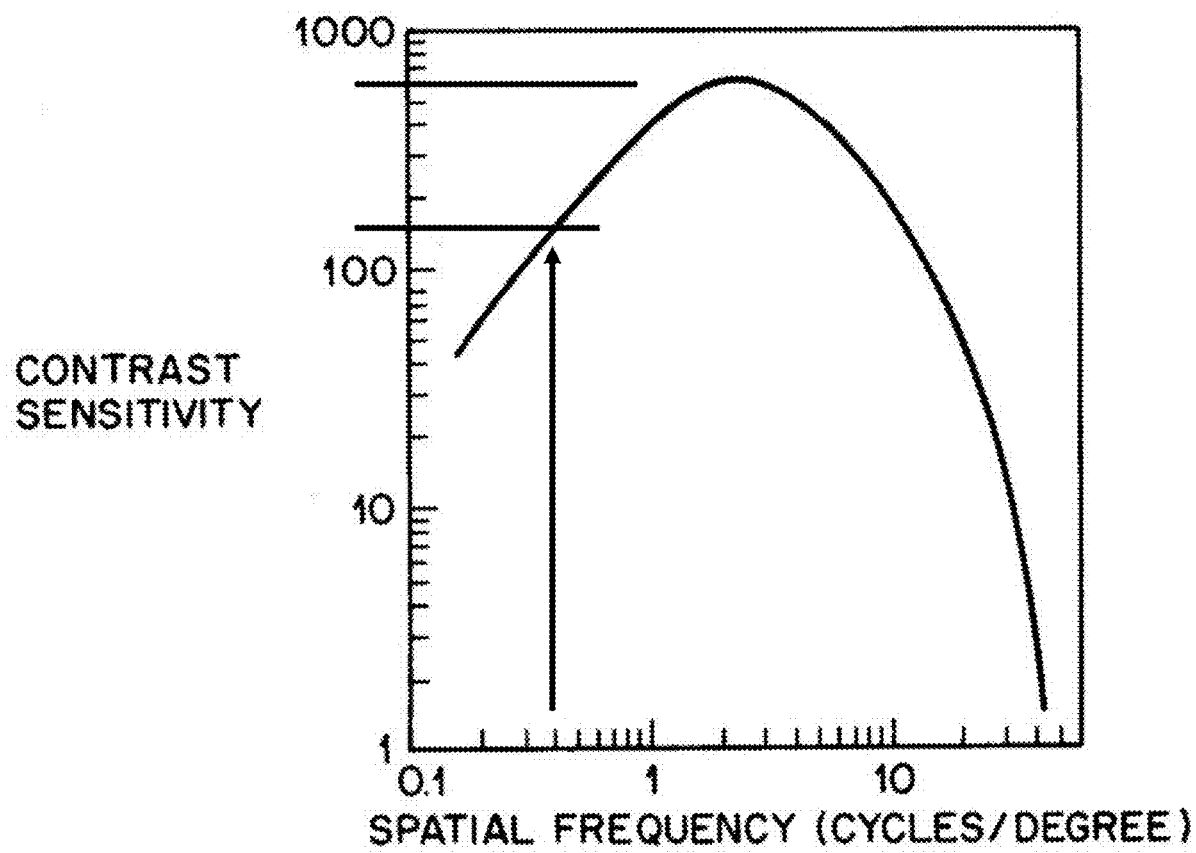
FIG. 14 shows a plot of the Contrast Sensitivity Function, from G. E Legge "*A Power Law for Contrast Discrimination*", Vision Research, page 457-467 (1981).

The contrast sensitivity function shown in FIG. 14 can be used to estimate how likely it is that the light scattered from the fiducial will be noticed. The study of contrast sensitivity in human vision is a vast field that is outside the scope of this disclosure to fully explain. But it quantifies the phenomenon that the eye sees moderate spatial frequencies much better than other high or low frequencies. An example is that people don't notice haze from weak cataracts that are developing in the eye, because the scattered light is spread fairly uniformly across the retina.

With an eye focal length of 25 mm, a spot size of 1.3 mm on the retina corresponds to a 3 degree angle, which is equivalent to 0.33 cpd (cycles per degree). FIG. 14 indicates that features at 0.33 cpd are about 4 times less noticeable than features at the peak of the eye's spatial discrimination at 3 cpd.

The analysis methods outlined in this disclosure indicate how we can estimate the visual impact of various fiducial patterns and shapes on vision acuity. Shorter dimple depth radius features are desirable to spread the transmitted light out more on the retina. Smaller dimple diameters are preferable simply to reduce the amount of light being deflected. The analysis seems to indicate that typical variations one might employ are not likely to make much difference on visual acuity, because the effects are relatively small.

From the 3-D raytraced simulations, with 50 rays collected out of 32,000, the brightness of the spot is 0.0015 times the brightness of the focused spot. We simply divide that value by 4 from the consideration of the contrast sensitivity function to get 0.0004. So, light from the fiducial is about 2500 times less noticeable than the peak of normal vision. A 2500× reduction is roughly equivalent to looking through an optical neutral density filter of strength=ND3, which most people describe as being completely dark when looking at normally lit scenes.

Figure 18:
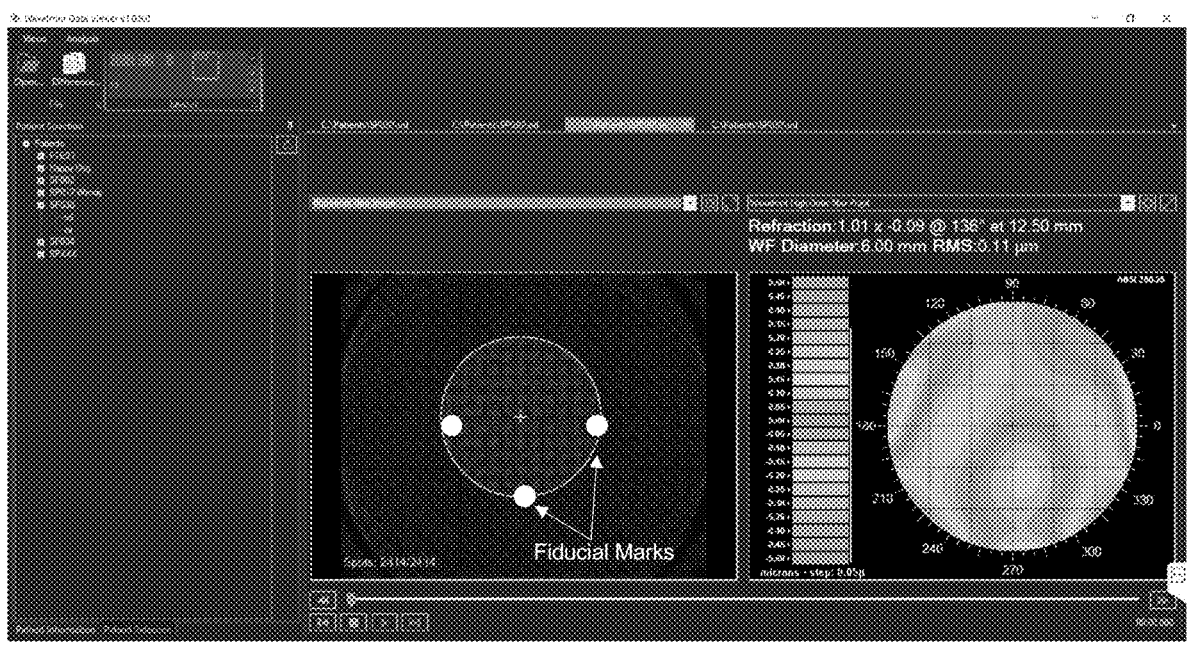
FIG. 18 shows a screen-capture of the wavefront analysis program displayed by the optical instrument (aberrometer), showing a wavefront image on the left side with 3 dark spots (illustrated as white spots for ease of viewing), and a 2-D contour map showing the wavefront higher order errors across the eye with CL, according to the present invention.

Fiducial marks on a CL are used when the wavefront and trial CL measurements are being performed. However, once the prescription has been measured and determined, the fiducial marks could be moved farther out in radius on a wavefront-corrected CL, so that they only create dark regions when the pupil is dilated. Or the marks might be omitted altogether. This might have some small benefit in that there would be no spots in the patient's visual field. Whether or not the spots have any significant optical effect on vision, it is likely that some patients will feel that spots in the visual field is less than optimal. An example of a lens with fiducial marks located just at the inside edge of the pupil diameter is shown in FIG. 18 (where the dark spots are illustrated as white spots for ease of viewing). Our analysis indicates that these small obscurations will have a very small influence on the overall wavefront aberrations.

The fiducials will cause there to be locations where a sharp surface transition appear across a WFS's lenslet. The result is that the focal spot that forms will be malformed, and that particular lenslet is not suitable for inclusion in the wavefront calculation. Software filters can find such spots easily and reject them from the wavefront calculation. Both spot quality, and/or slope filters, were found to work well.

Wavefront accuracy can also be enhanced by taking advantage of dynamic measurements. Since the CL wiggles slightly from frame-to-frame, missing Shack-Hartmann WFS spots can be accounted for during normal lens movement.

Most combined wavefront aberrometer/topographer systems have an additional CCD camera that provides a conventional visible image to aid in system alignment by an operator. This second camera (i.e., Iris camera) can also be used locate the fiducial features by using retro-illumination. Retro-illumination is a technique employed on almost every patient that visits an optometrist, when the optometrist shines a light into the eye and observes the light that comes back out. The light enters the pupil, and then a small portion of light scatters off the retina and back out through the pupil.

Figure 15:
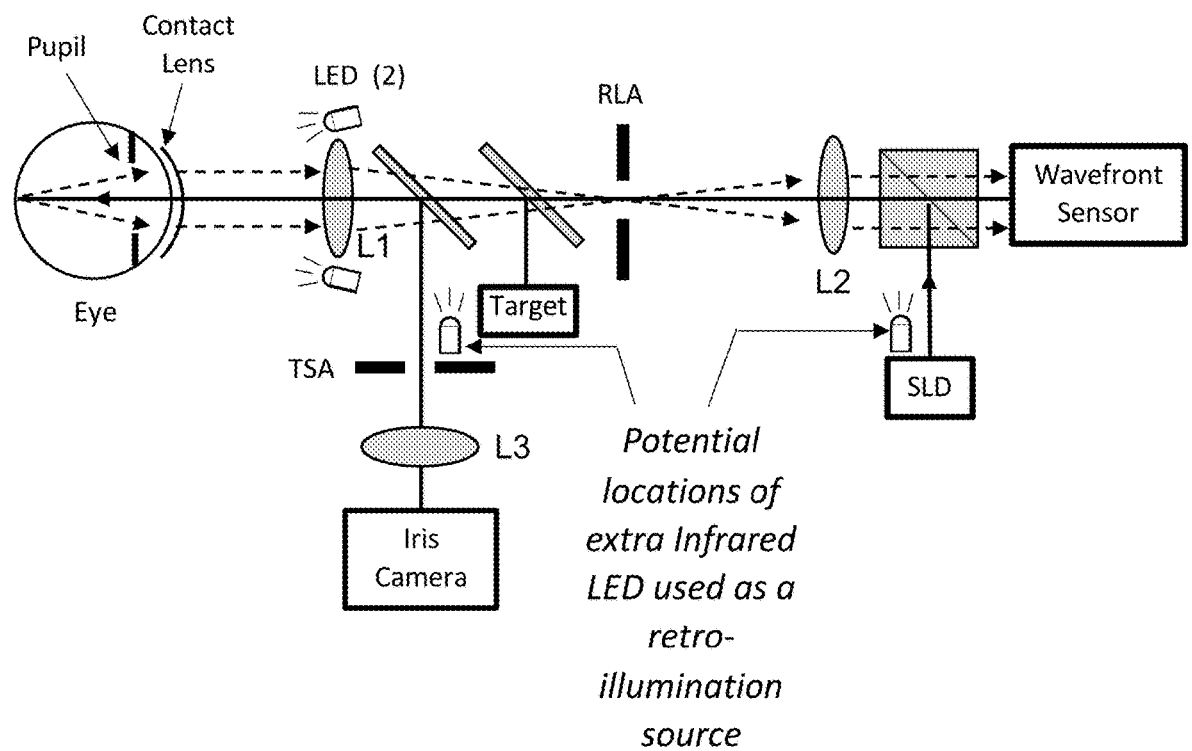
FIG. 15 Shows a schematic example of an improved optical system for performing wavefront analysis of an eye, where one or more additional LED's have been added to provide retro-illumination of the eye, according to the present invention.

FIG. 15 shows a modification to the schematic optical system shown in FIG. 3, where one or more additional infrared (or near-infrared) LED's have been added to act as a retro-illumination source. Ideally, this additional source is located as close to the main optical axis as practically possible. A couple of configurations are possible, as shown in FIG. 16.

With retro-illumination, fiducial marks on the CL will appear as dark spots on the camera. A potential advantage of using a conventional CCD camera is that the resolution is much higher than the pitch of a lenslet array in the WFS, so the fiducial features on the CL can be made smaller in size (which also reduces any negative influence of the dimples on vision acuity).

There are two cameras in some embodiments of the optical instrument of the present invention, i.e., the IRIS visual camera and the WFS camera (both are CCD cameras). The IRIS camera uses reflective IR light, and the WFS camera uses transmissive IR light (that is also why we could only see the information inside the pupil and not outside the pupil, as pupils are transparent). As a result, in order to generate dark spots in a wavefront image, it requires transmissive light.

Figure 16:
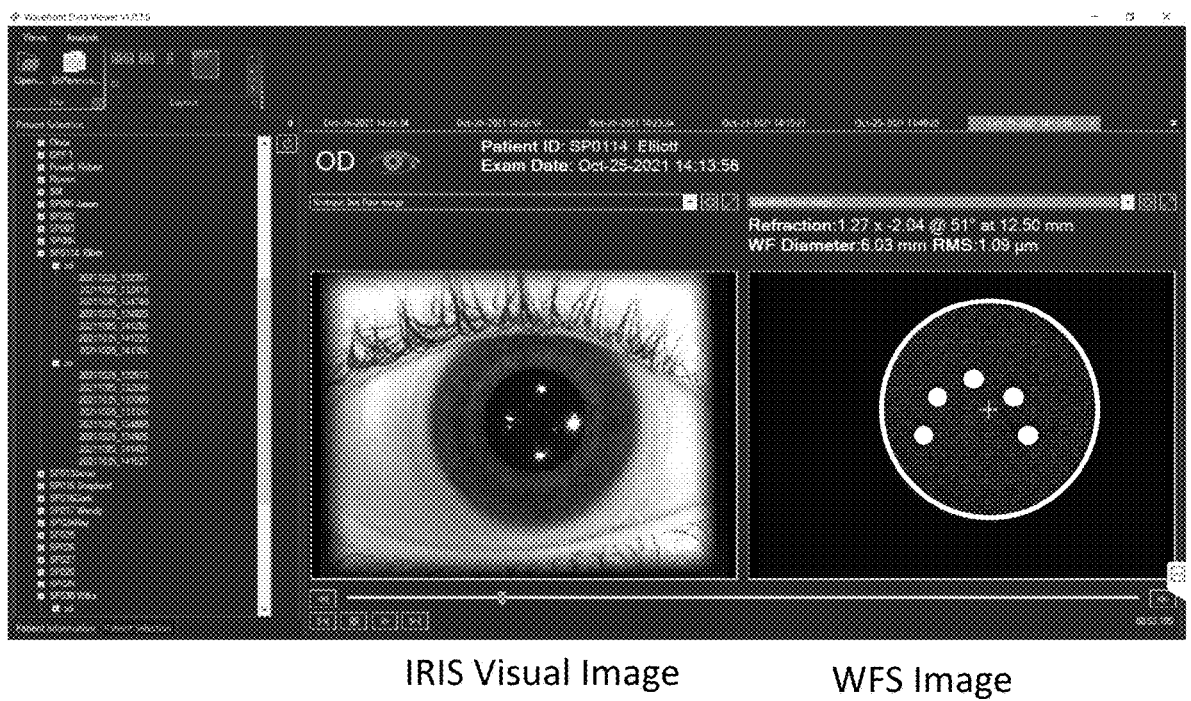
FIG. 16 shows a screen-capture of the wavefront analysis program displayed by the optical instrument, showing a visible image of an eye with a contact lens on the left side showing 4 glints, and showing a wavefront image on the right side with five dark spots (illustrated as white spots for ease of viewing), according to the present invention.

Referring to FIG. 16, a series of studies were performed where a CL was initially inserted with the fiducials positioned in the lower half of the lens: at 0, 180, 225, 270 and 315 degrees). However, after a period of time (>30 min.) the lenses had rotated approximately 180° up to the upper half of the lens. Hence, the positions of the fiducials in FIG. 16 are now upside down. This same behavior was repeated the lens was placed back to its original orientation. Thus, the fiducials can be used as a means for mechanically stabilizing the rotation of the CL on the eye, by mechanically interacting with the eyelid. For WFG CLs this is very important, since the wavefront correction will only be accurate if the lens has the correct XY position and rotational orientation.

ALTERNATE EMBODIMENTS

In an alternate embodiment, it is possible to avoid having the fiducials affect the vision completely. During the fitting process, it is desirable to use the largest pupil size possible. This allows the spacing between adjacent fiducial marks to be as large as possible, which is desirable for increasing the sensitivity and accuracy of the misalignment measurements. This is accomplished by either ensuring that the subject is completely dark adapted, or the pupil is dilated with a chemical agent. In either case, the size of the measurement pupil is larger than the natural pupil in typical lighting. Thus, there is a temporary annular ring (annulus) that is exposed during the measurement process (the annulus is not normally present during day-to-day use). By placing the fiducials in this annular ring, they then can be observed during the measurement process, but will never affect the vision during normal conditions. This will require some advanced knowledge of the size of the subject's normal pupil, which is routinely observed during initial screening. This is illustrated in FIGS. 17A, 17B, and 17C.

Figure 17A:
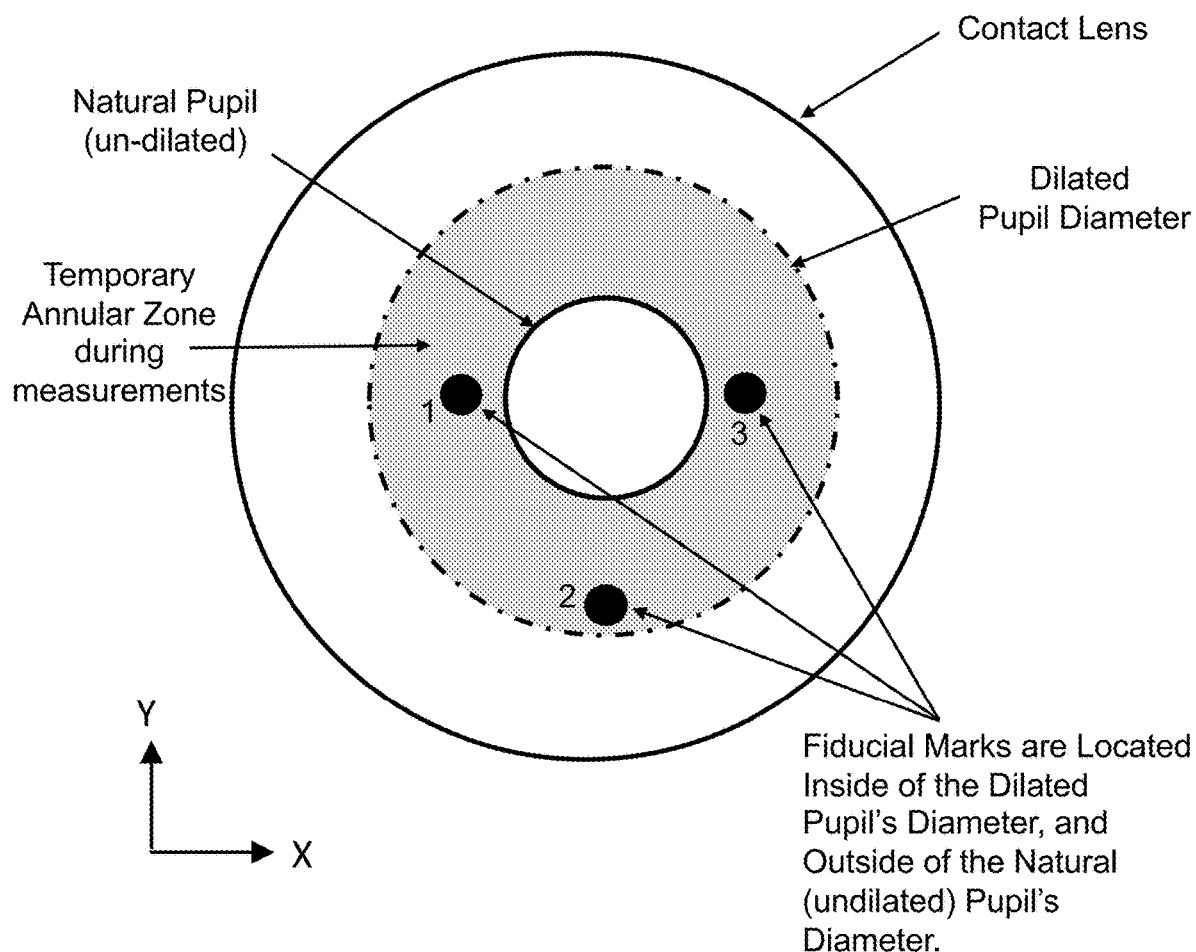
FIG. 17A shows a schematic front view of an example of a pupil (dilated and un-dilated), with three fiducial marks disposed on a CL inside an annular zone located in-between the two pupil circles, according to the present invention.

FIG. 17A shows a schematic view of an example of two different pupils (dilated and un-dilated), with three fiducial marks disposed on a CL in the temporary annular zone that is defined between the two different pupil circles (dilated and un-dilated). The fiducials are placed inside this temporary annular zone (i.e., annulus defined by the inside of the dilated pupil circle, and the outside of the natural (undilated) pupil circle). In this example, the fiducials are located 2.75 mm away from the geometrical center of the CL, and are placed at 0, 180, and 270 degrees. In this configuration, the fiducials can be observed during the measurement process, but they will never affect the vision during normal (un-dilated) conditions because the fiducial marks are located outside of the natural, un-dilated pupil; where the iris blocks light rays from hitting the fiducial marks. This will require some advanced knowledge of the size of the subject's normal pupil (which is routinely observed during initial screening).

Figure 17B:
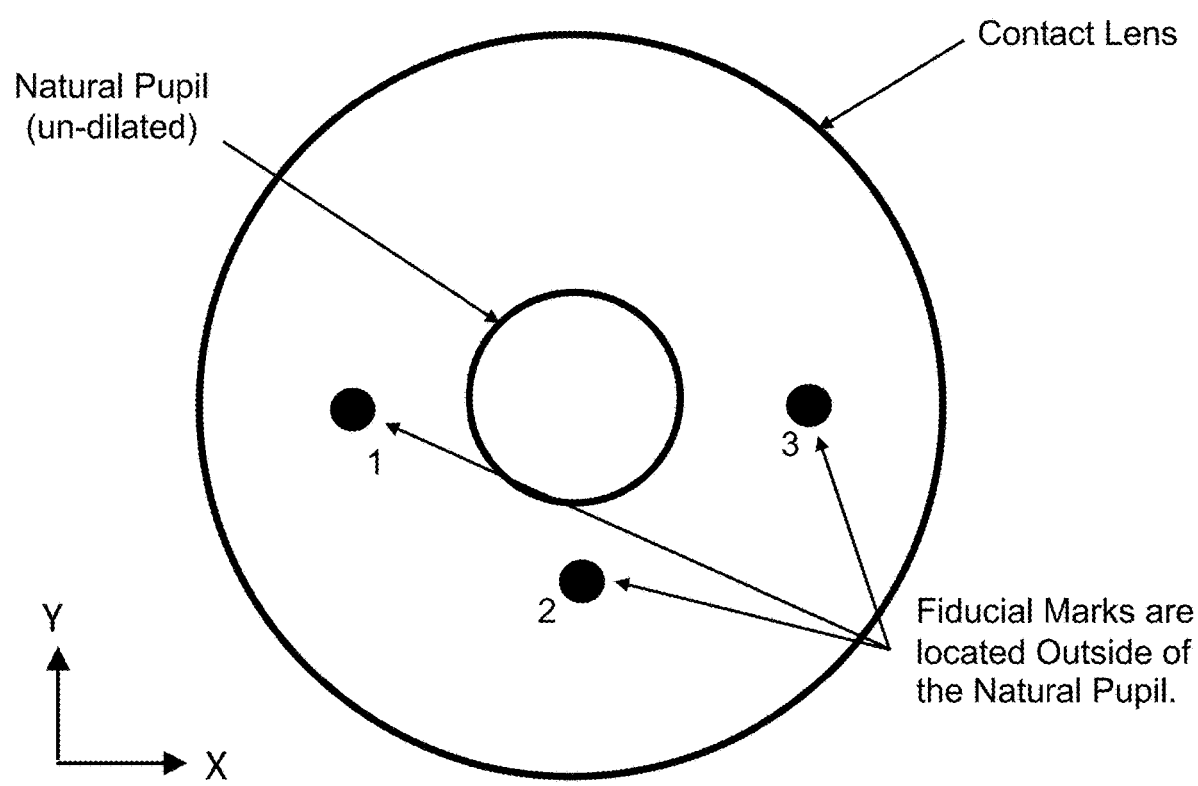
FIG. 17B shows a schematic front view of an example of a CL with three fiducial marks disposed thereon, which are located outside of the natural pupil's diameter, according to the present invention.

FIG. 17B shows a schematic view of an example of a CL with three fiducial marks disposed thereon (see FIG. 17A), and located outside of the natural, un-dilated pupil's diameter, according to the present invention.

Figure 17C:
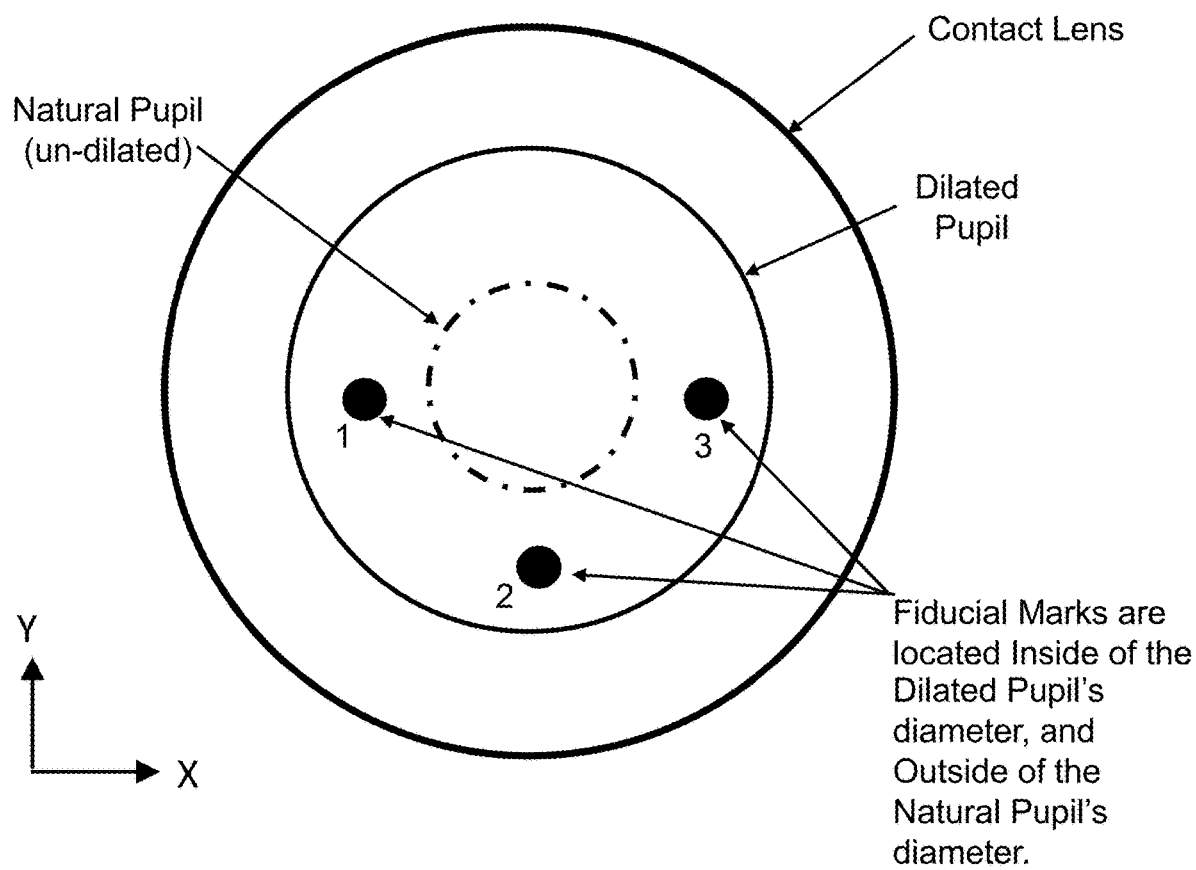
FIG. 17C shows a schematic front view of an example of a CL with three fiducial marks disposed thereon, which are located inside of the dilated pupil's diameter, outside of the natural pupil's diameter, according to the present invention.

FIG. 17C shows a schematic view of an example of a CL with three fiducial marks disposed thereon (see FIGS. 17A and 17B), which are located outside of the natural, un-dilated pupil's diameter, according to the present invention.

The embodiments of the invention previously described above uses the WFS's images to identify and locate the fiducials on the CL, which are subsequently used to determine misalignments of position (decentration) and/or misrotation (if any) of the CL.

An additional advantage to the use of recessed dimples or raised bumps in the front surface of the CL is that these features can interact with the eyelid to change and/or mechanically stabilize the orientation of the CL.

FIG. 18 shows a screen-capture of the wavefront analysis program used by the optical instrument, showing a WFS image on the left side with 3 dark spots (illustrated as white spots in this figure for ease of viewing), and a 2-D contour map showing the RMS wavefront aberrations, according to the present invention.

The TSA component used in the optical instrument (e.g., a WaveDyn™ combined topographer/aberrometer) plays an important role in determining the best optical performance of the instrument. The TSA aperture size is preferably small (e.g., 2.5 mm), which increases the depth of field of the imaging camera. However, the smaller the aperture opening in the TSA, the less intense the glints are, because fewer rays are scattered from the dimple and collected by the camera.

A variety of geometric parameters were studied parametrically (using ray-tracing software), to see what effect they have on the dimple's brightness. Variables studied include: (1) TSA diameter, (2) depth of dimple, (3) radial distance of the dimple from the optical axis, and (4) radial distance of the illuminating LED from the optical axis.

Figure 19:
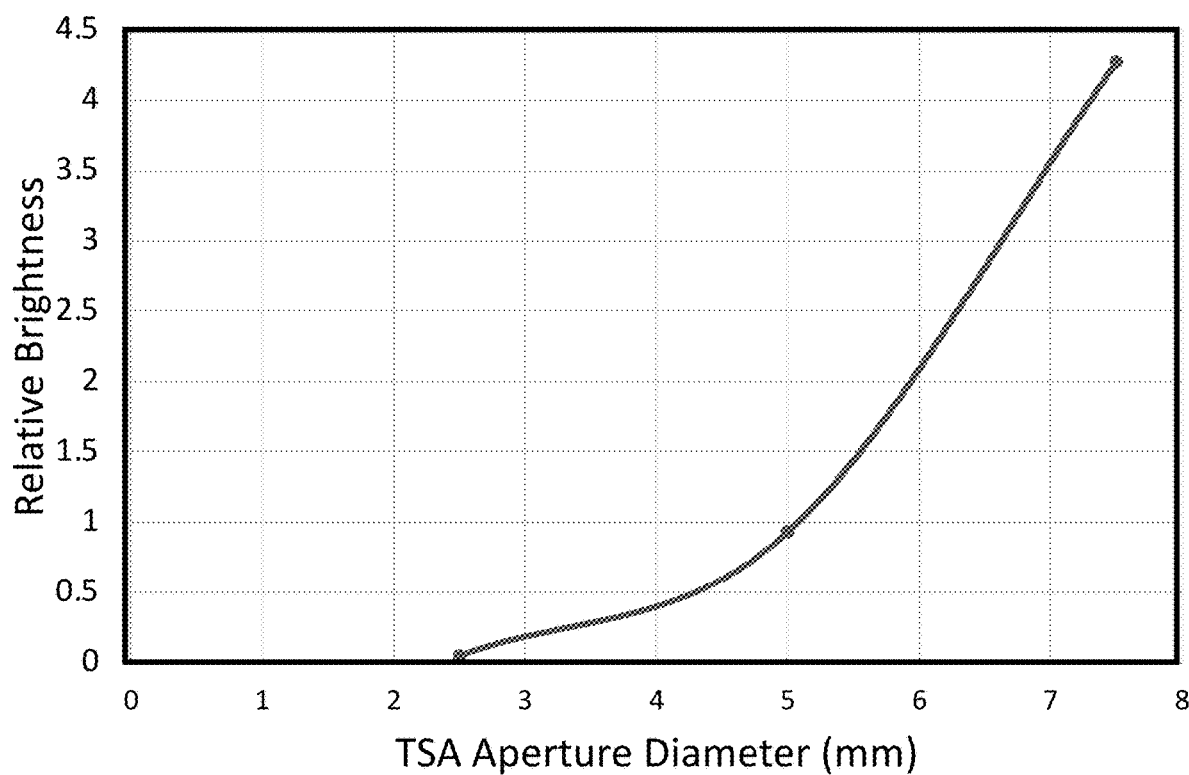
FIG. 19 shows a plot of the relative brightness of a fiducial dimple versus the diameter of the telecentric stop aperture (TSA), according to the present invention.

FIG. 19 comprises ray-tracing simulation results showing relative brightness of a fiducial dimple versus TSA aperture diameter. Here the dimple is located 4 mm off-axis, has a radius of curvature=0.26 mm, and a depth of 0.11 mm. The dimple's brightness increases significantly as the TSA diameter increases (which was expected).

Figure 20:
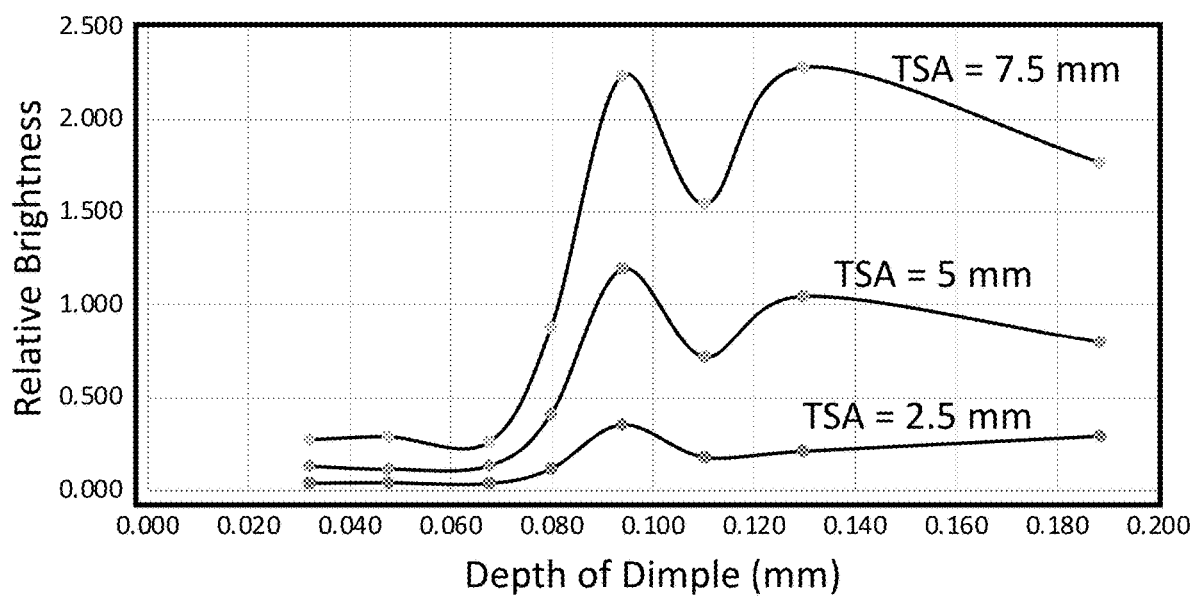
FIG. 20 shows a plot of the relative brightness for a fiducial dimple versus depth of the dimple (mm), for different TSA diameters, according to the present invention.

FIG. 20 shows the fiducial's brightness as we increase the depth of the dimple (from 0.03 to 0.19 mm). Increasing the dimple's depth causes a significant increase in the dimple's brightness, while increasing the TSA's aperture size (from 2.5 mm to 7.5 mm) also significantly increases the dimple's brightness. An optimum dimple depth ranges from 0.09 to 0.13 mm. Increasing the dimple depth beyond 0.13 mm causes the dimple's brightness to gradually decrease.

Figure 21:
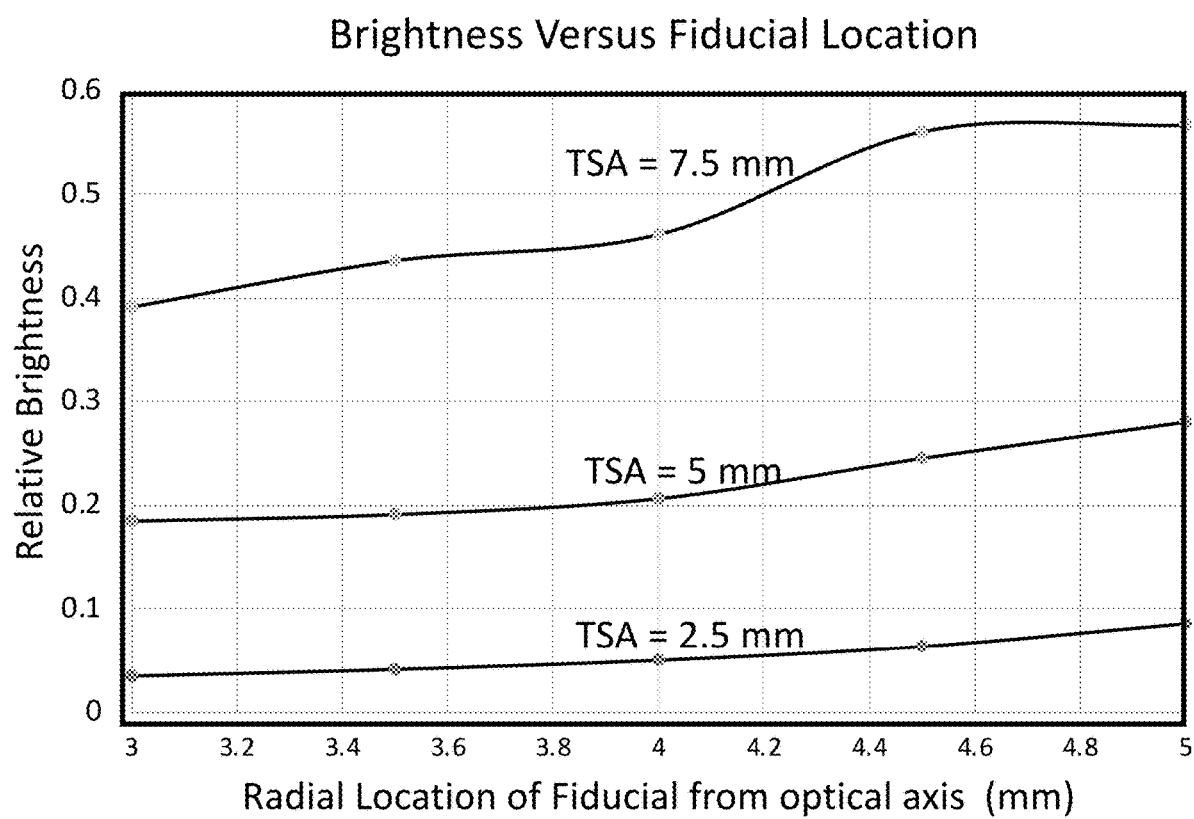
FIG. 21 shows a plot of the relative brightness for a fiducial dimple versus Radial Location of Fiducial from Optical Axis (mm), for different TSA values, according to the present invention.

FIG. 21 shows fiducial brightness versus radial location of the fiducial dimple from the optical axis (ranging from 3 to 5 mm). Here, we see that the brightness increases slightly as the dimple is moved farther out from the optical axis. And, as before, increasing the TSA's size (from 2.5 mm to 7.5 mm) significantly increases the dimple's brightness.

Figure 22:
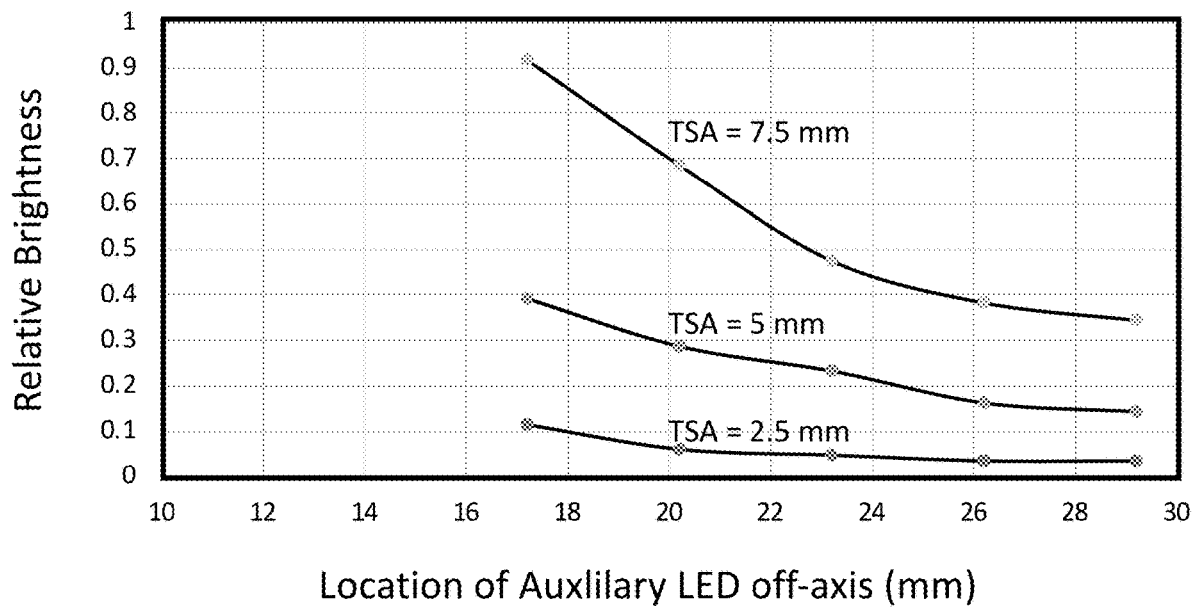
FIG. 22 shows a plot of the relative brightness for a fiducial dimple versus the radial distance from an auxiliary LED to the optical axis (mm), according to the present invention.

FIG. 22 shows the fiducial brightness versus radial distance of the LED from the optical axis (ranging from 17 mm to 29 mm radial distance). For example, in the current version of the WaveDyn™ VA optical instrument the illuminating LED is radially located at 23 mm from the optical axis. Here, we see that the dimple's brightness decreases as the radial distance of the LED from the optical axis increases, with the effect being larger for larger TSA apertures. So, preferably, the illuminating LED is located as close to the main optical axis as possible (given practical limitations).

One solution to this problem is to add an electro-mechanical solenoid that flips the TSA component out of the main optical path. This has been successfully used in previous optical instruments.

Another approach to increasing dimple brightness is to place the illuminating LED as close to the optical axis as possible, as shown in FIG. 15. This can be accomplished by rounding-off the round lenses (L1 and quarter wave plate QWP), by machining these optical elements to make them square or rectangular in shape. Alternatively, these optical elements can be made of polymer that is cast into the square or rectangular shape.

Another approach to increasing dimple brightness is to use a light pipe (e.g., an optical fiber or optical waveguide) to direct the LED light radially closer to the optical axis. Another approach is to use a small, thin board with surface mount LED(s).

Modified TSA

We can improve the imaging of fiducial marks on CLs with a simple change to the optical instrument. Basically, we replace the current TSA component (a metal disk with a small central hole, 2.5 mm in diameter) with an IR selective film that also has a hole in the middle. The IR selective film surrounding the hole blocks, for example, 780 nm light, but transmits, for example, 940 nm light. This then retains the long depth of field when the 780 nm LEDs are ON (because the aperture remains small at 2.5 mm). But when the 940 nm LEDs are ON, we get a wider range of locations where glints emitted from dimples in a CL make it to the camera. The IR selective film can be made from Kodak Wratten filter 87C film material, or it can be a much lower cost alternative film made by Lee Precision, Inc.

Figure 23:
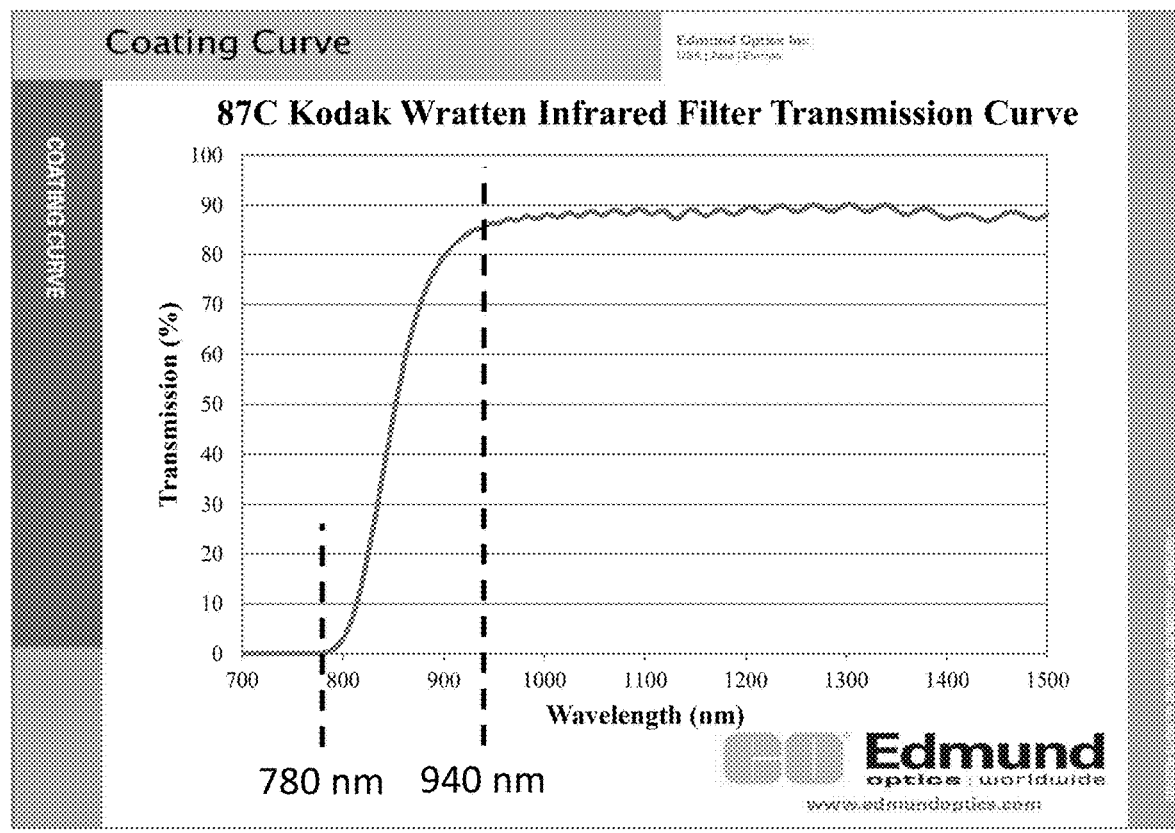
FIG. 23 shows a plot of the transmission efficiency (%) for Kodak Wratten 87C Infrared Filter film, as a function of wavelength (nm).

FIG. 23 shows a transmission spectrum for the Kodak Wratten filter 87C film. Here, we see that the transmissivity drops off precipitously for wavelengths less than about 900 nm. This allows the modified TSA to pass 940 nm light through the film (i.e., it is transparent to 940 nm light), while almost completely blocking the shorter wavelength light at 780 nm. The hole in the IR selective film can be made by a focused laser.

Geometrical Relationships

Figure 24A:
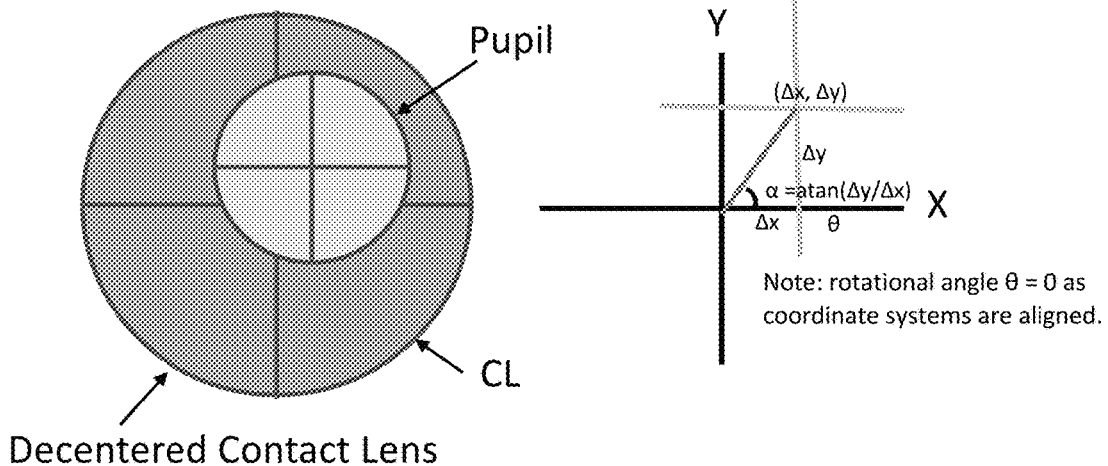
FIG. 24A shows two Cartesian coordinate systems of the CL and pupil when the CL is rotationally aligned but decentered in the XY plane, and corresponding symbols for calculating the offset and rotational angle, according to the present invention.
Figure 24B:
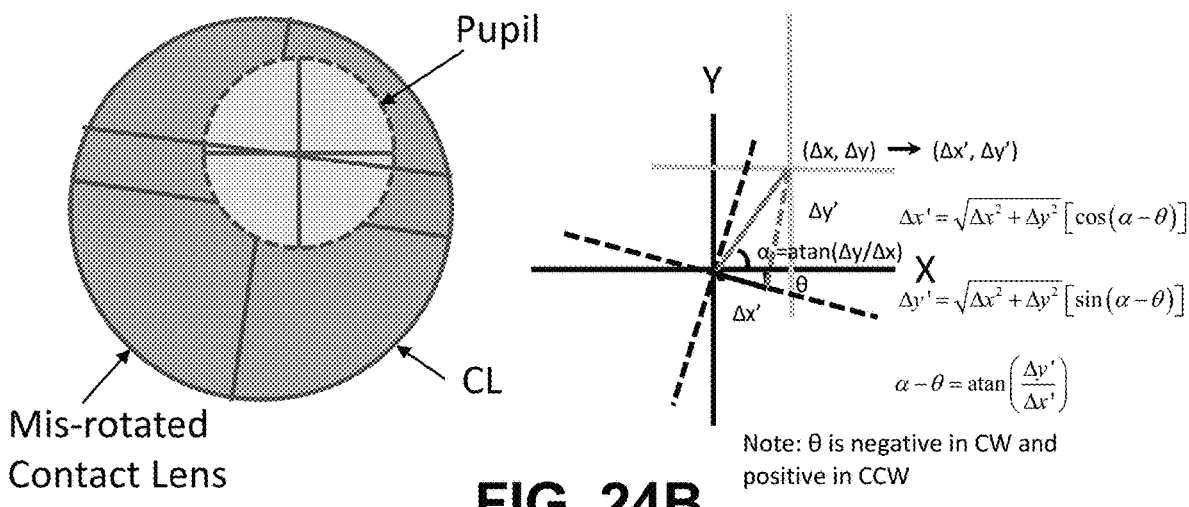
FIG. 24B shows the CL is mis-aligned and mis-rotated with the relative offset being the same as the previous figure (FIG. 24A), and the corresponding quantities expressions, according to the present invention.
Figure 24C:
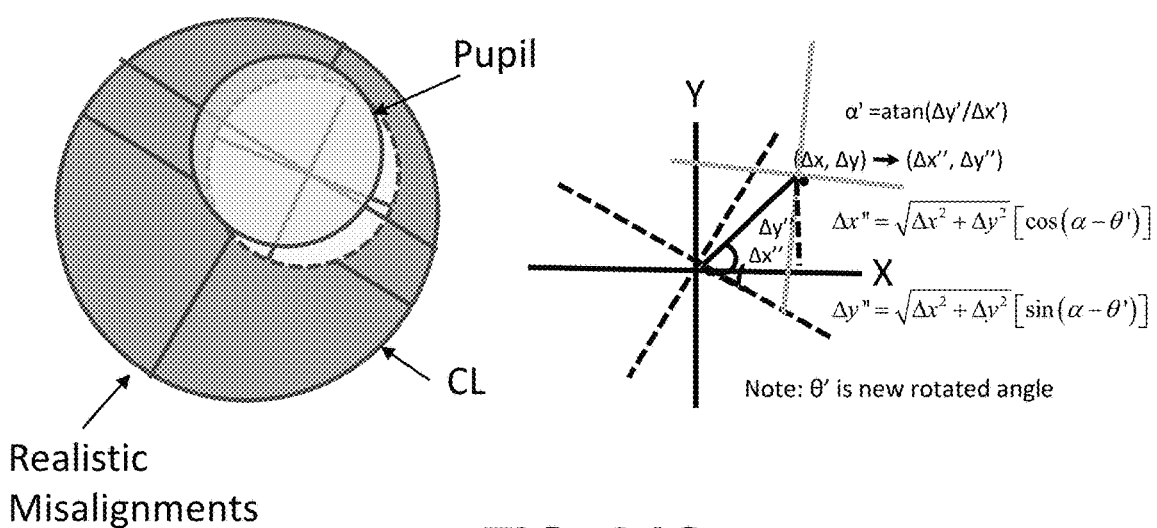
FIG. 24C shows a realistic scenario where the CL movement is independent of pupil, including both XY decentrations and mis-rotations, and the final and comprehensive expressions for arbitrary offset and rotational angle, according to the present invention.

FIGS. 24A-C define a Cartesian coordinate system and associated geometrical formulas for uniquely locating the XY position and rotation of a misaligned CL, relative to a pupil's location, based on knowing the position of at least three fiducial marks on the CL.

Regarding FIGS. 24A, 24B, and 24C, the following discussion applies. The geometry, corresponding coordinate systems of both CL and pupil, and trigonometric functions that are used to sort out the relationship are demonstrated in these figures. When there is no rotational misalignment on the CL, as illustrated in FIG. 24A, the rotational angle $\theta=0$ and the offset between the pupil and CL, $\Delta x$ and $\Delta y$ in horizontal and vertical directions, can be directly obtained from the measurement using the optical instrument. However, this ideal scenario is rare. More commonly, the marked horizontal direction of the CL is tilted, either in clockwise (CW) or counter CW (CCW) direction, which complicates the situation.

One common misunderstanding is that measured offset $\Delta x$ and $\Delta y$ are still the same, as presented in FIG. 24B. However, (1) the pupil's and CL's movements are independent of each other when CL is tilted (the pupil does not change with it), and (2) measured $\Delta x$ and $\Delta y$ offsets are relative to the absolute horizontal and vertical offset. As a result, the proper offset $\Delta x''$ and $\Delta y''$, presented in FIG. 24C, can be obtained from comparing the measured coordinates. Rotated angle $\theta'$ can also be obtained from the trigonometric calculations, also.

Note: the present invention can be used with any type of CL, including, but not limited to, traditional Axisymmetric CL, Toric CL, Multi-Focal CL, Scleral CL, and WFG corrected CL's.

In another embodiment (see FIG. 17A), the fiducial marks can be located inside an annular zone that is: (1) located inside of a dilated pupil of the eye during screening, and (2) is located outside the natural (un-dilated) pupil of the eye.

Figure 25:
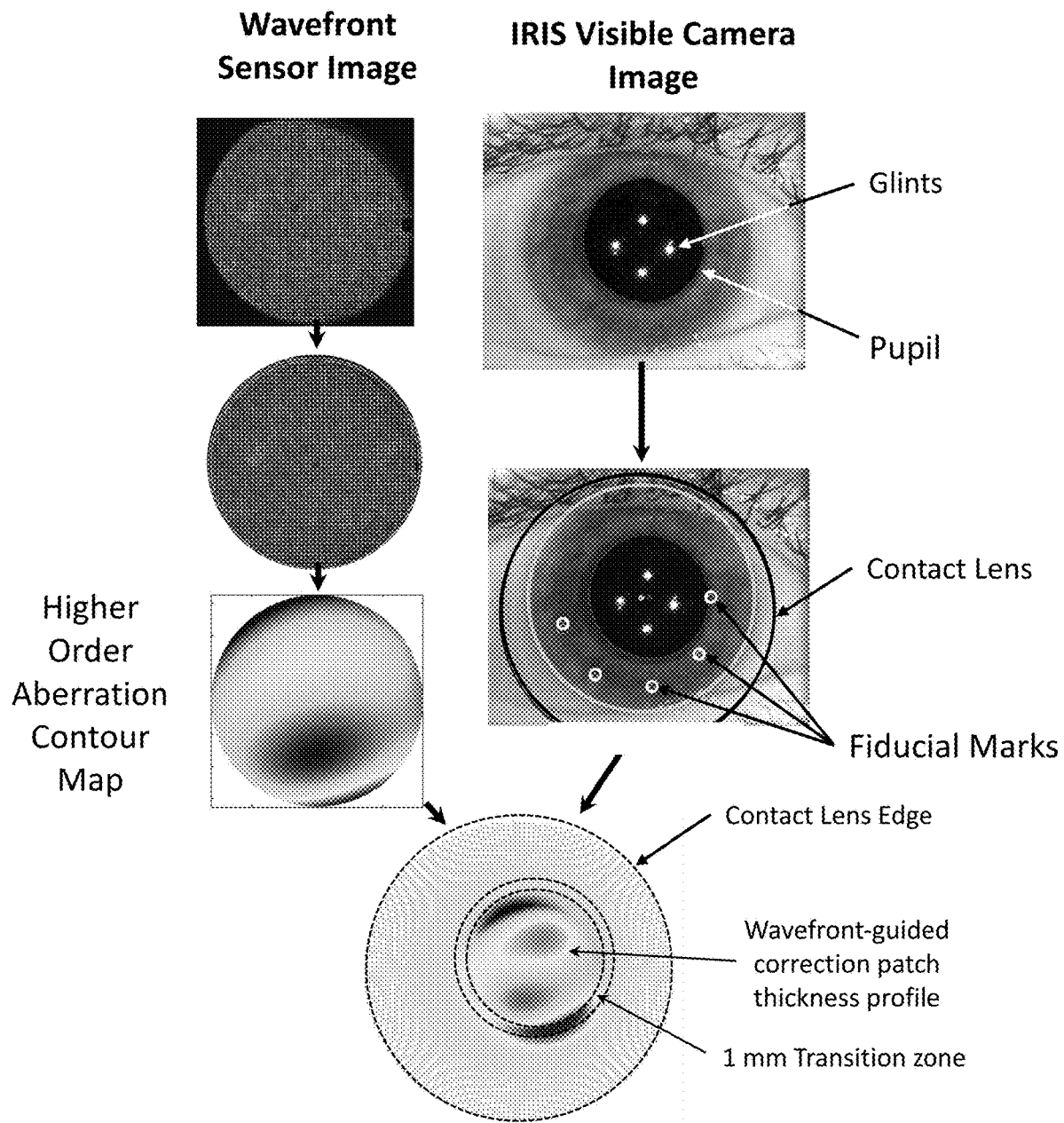
FIG. 25 shows the procedure of WFG CL design, where the left is from WFS image to the aberration profile, and the right is to identity the offset and rotational angle with the designed fiducial marks information, according to the present information.

FIG. 25 is an illustrative flowchart of utilizing both the WFS and the IRIS camera images from the optical instrument and applying the measured wavefront information onto the exact position (offset and rotational angle). An example of a WFG customized CL design process starts with a 10-30 second dynamic eye measurement for a patient with the well-fit trial CL marked with pre-defined fiducials. The measurement captures both WFS and iris images and it allows the eye to experience blinks and other dynamic movements. From the measurement, the analyzed pupil size and wavefront information can be achieved from the WFS measurement, while the exact location of wavefront patch on CL and corresponding rotation angle can be collected from the Iris images. The centers and radii of pupil, iris and CL are identified and marked. In addition, from the predefined marked fiducials information and the comparison of the image, the rotation angle of CL is acquired. While all of them are collected, we can apply the thickness profile that contains the exact wavefront correction information and rotation angle to the right position, as presented in the bottom plot in FIG. 25. In addition, one can see 1 mm width transition zone from the wavefront patch's edge.

Figure 26:
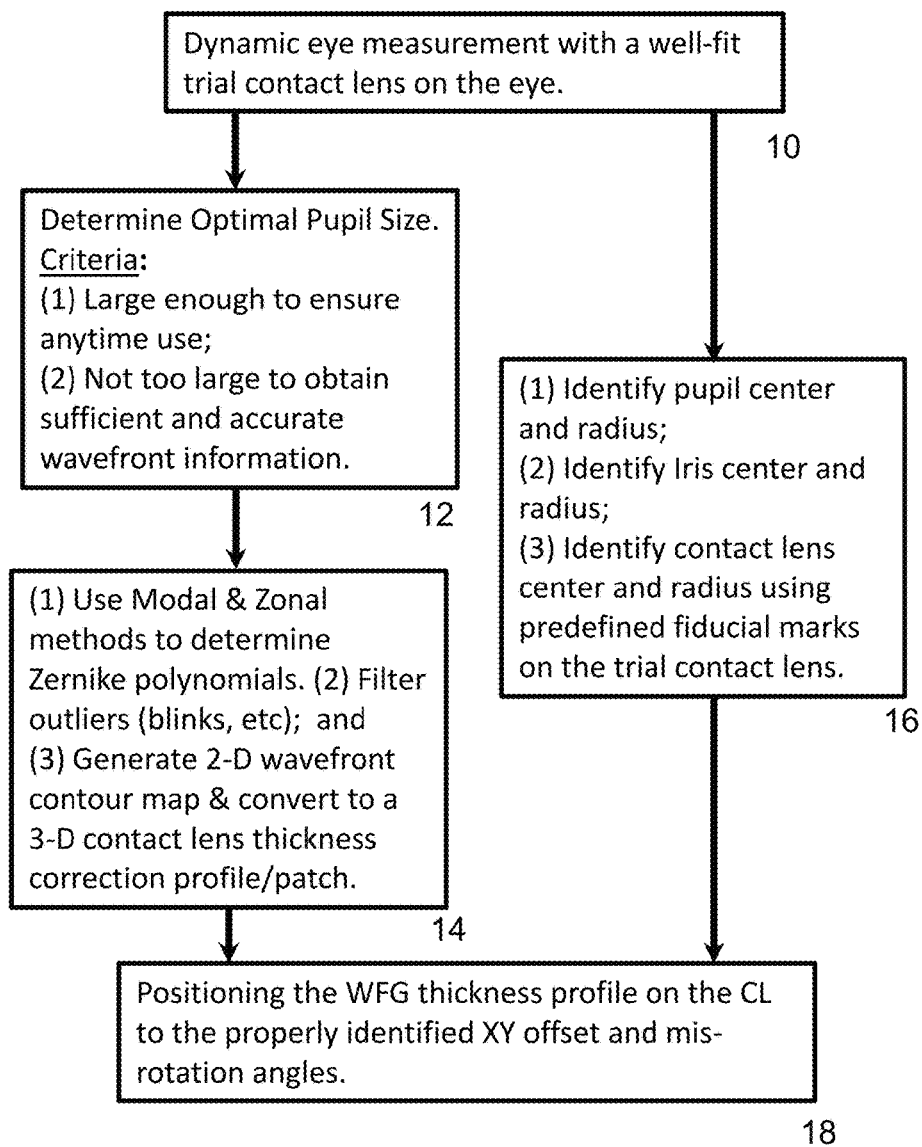
FIG. 26 shows an example of a customization process flow chart for making a WFG CL from FIG. 26, according to the present invention.

FIG. 26 shows an example of a CL customization process flow chart describing the steps for allowing a practitioner to properly position the WFG correction profile with the properly identified XY offset and rotation angle of the CL. First, in step 10, a dynamic eye measurement is made on a well-fitted, predicate (i.e., trial) CL using an optical instrument (e.g., a combined aberrometer/topographer). Then, in step 12, an optimal pupil size is determined, where the pupil size is large enough to ensure anytime use, and it is not too large to obtain sufficient and accurate wavefront information. Then, in step 14, (1) modal and zonal methods of wavefront analysis are used to generate Zernike polynomial coefficients; (2) outliers are filtered out (e.g., blinks); and (3) 2-D wavefront aberration maps are made and converted to a 3-D WFG CL thickness profile/patch. In parallel with steps 12 and 14, step 16 comprises (1) identifying the pupil's center and radius; (2) identifying the iris's center and radius; and (3) identifying the CL center and radius using predefined fiducial marks on the CL. Finally, in step 18, the 3-D WFG thickness profile/patch is accurately positioned on the CL using the properly identified XY offsets and mis-rotation angles. Additionally, placing fiducial marks on the WFG corrected CL can be used for making comparisons in step 18 to check whether the trial CL and the WFG CL behave in the same way.

In order to be "small", the diameter of the fiducial marks should be least 10 times smaller than the diameter of the subject's pupil.

Alternatively, the fiducial marks can be made of a reflective material (e.g., a reflective ink spot), which produces bright spots instead of dark spots. This would be useful if sufficient image contrast can be achieved.

Alternatively, the fiducial marks can comprise a spot made of a special ink that is reflective to infrared light, but is transparent to normal light. That way, the spot could be seen with an optical instrument that uses IR illumination light (but would not affect vision at all).

Alternatively, 3-D Printing be used to deposit ink spots, or raised bumps, which create dark spots. Raised bumps (or raised lines or other shapes protruding outwards from the anterior surface of the CL) could also serve to mechanically stabilize the CL on the eye.

One embodiment disclosed herein is a method and system for determining the tilt of a CL in order to determine the correct optical centration for correcting optics. There are several alternative embodiments that can be effective for this process.

No Fiducials

Figure 27A:
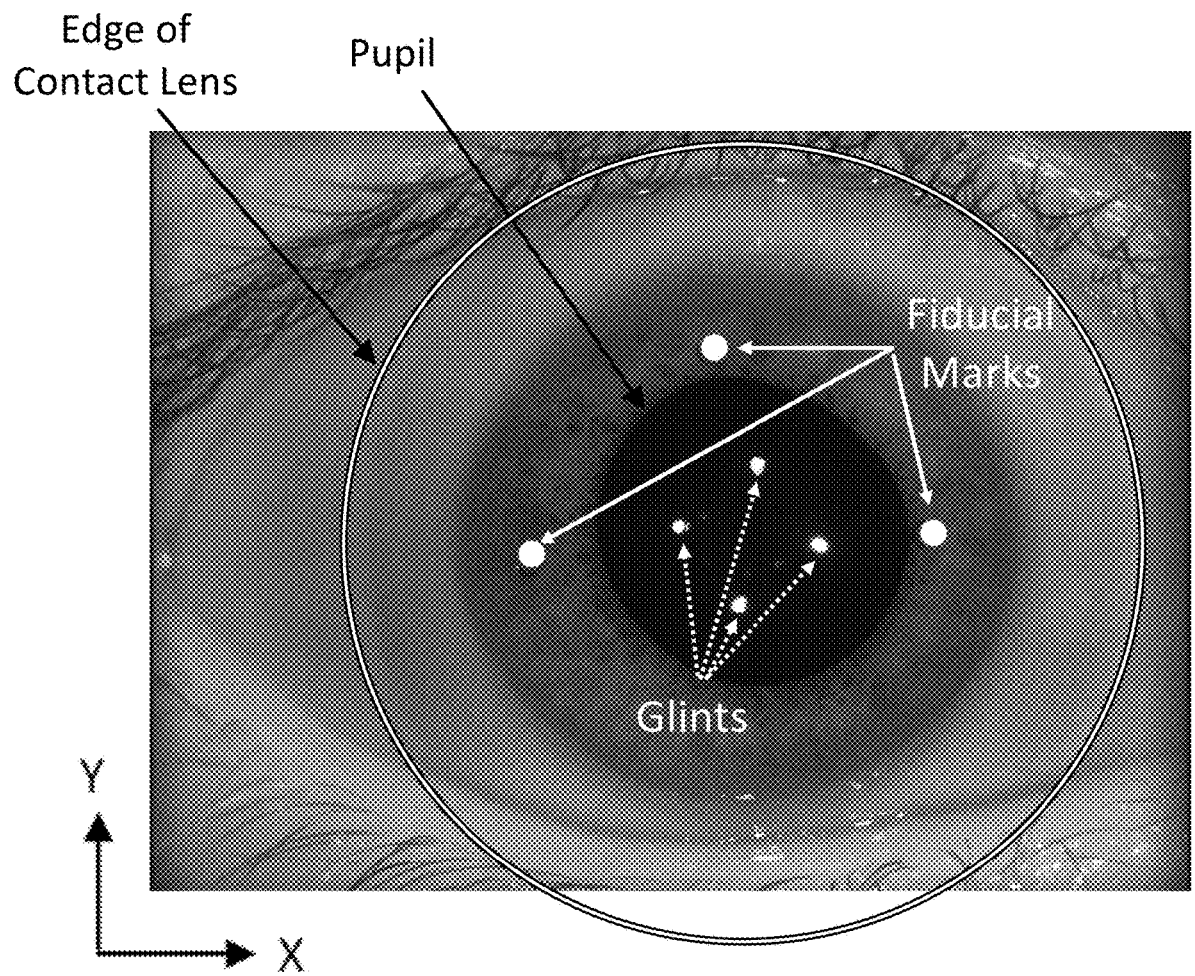
FIG. 27A shows a visual image of an eye with a CL with predesigned 3 fiducial marks, according to the present invention.
Figure 27B:
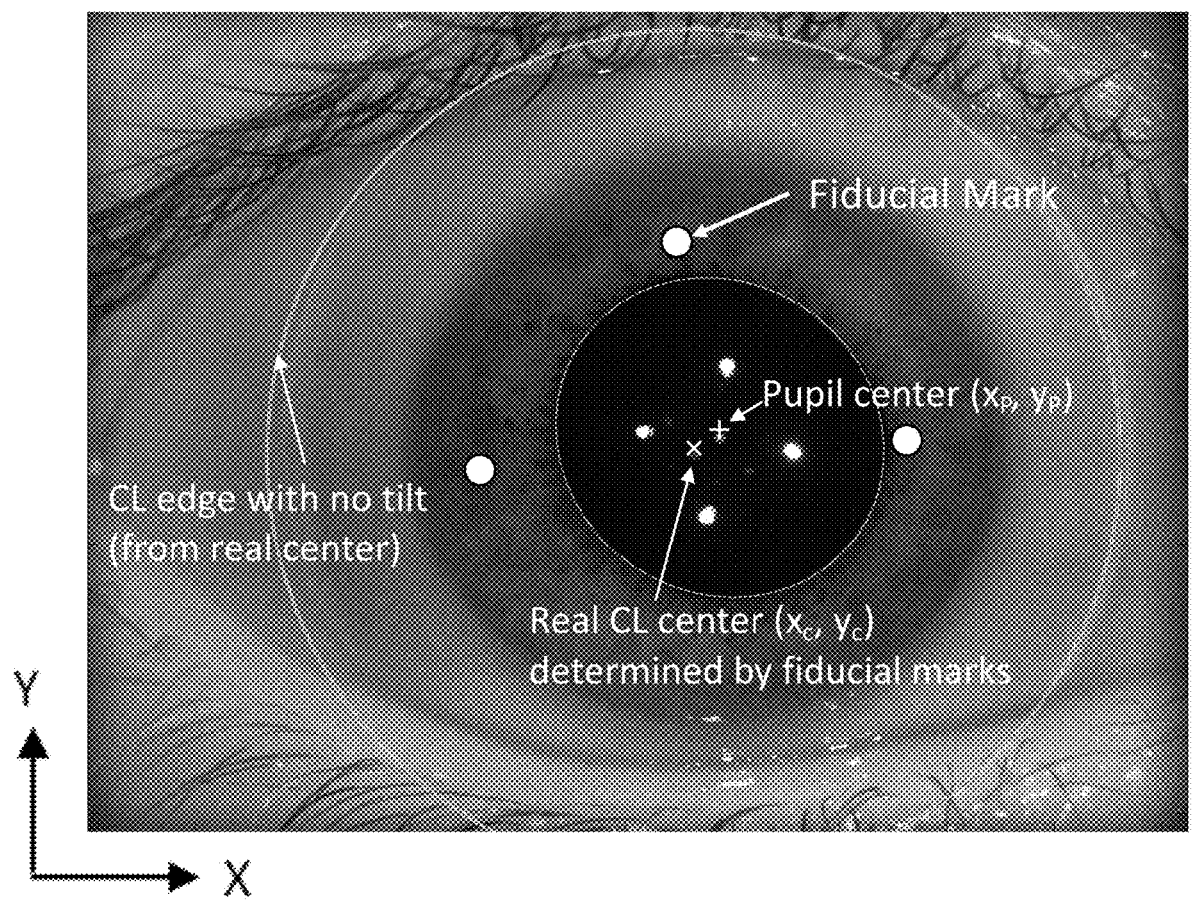
FIG. 27B shows the same visual image as FIG. 28A with identified pupil center, real CL center obtained by fiducial marks and the CL edge without tilt, according to the present invention.
Figure 27C:
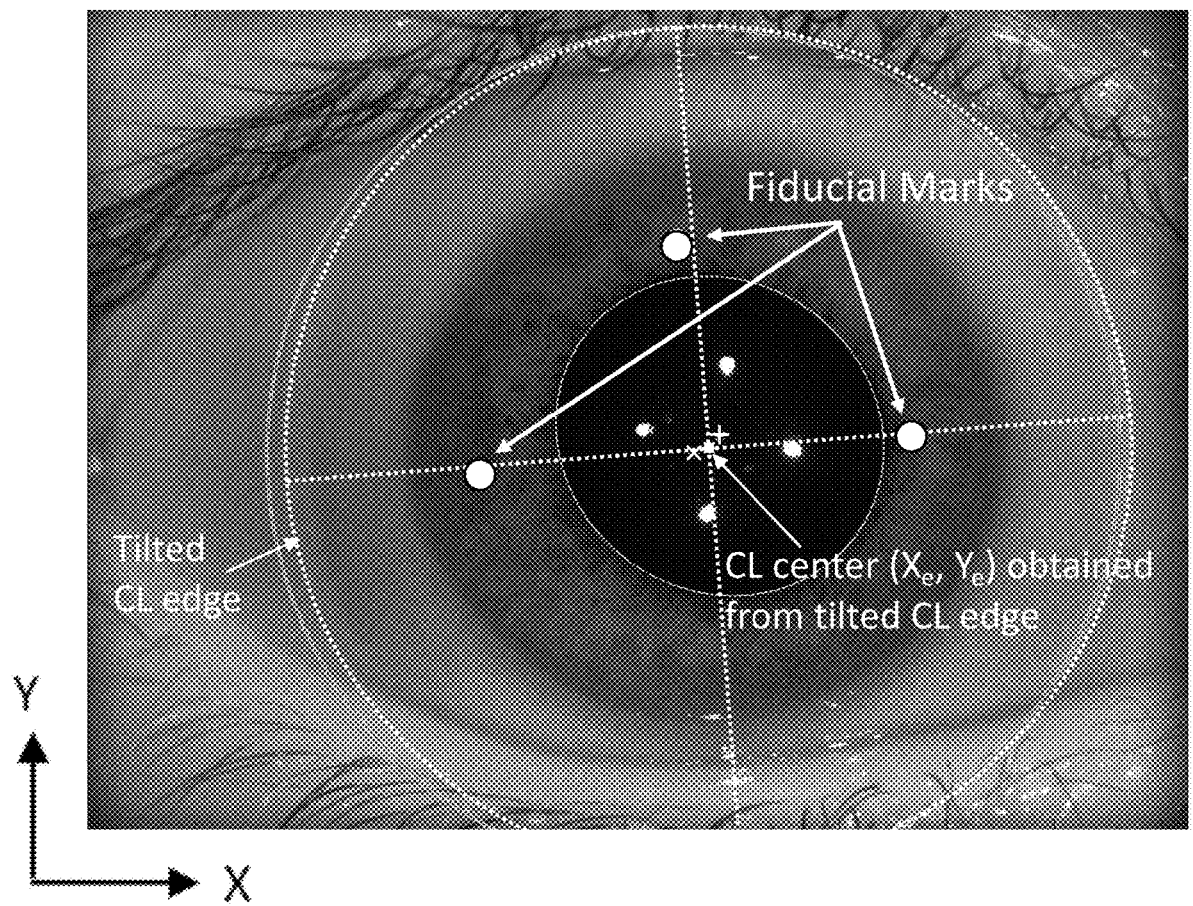
FIG. 27C shows the same visual image as FIG. 28A with virtual CL center determined by tilted CL edge, according to the present invention.
Figure 27D:
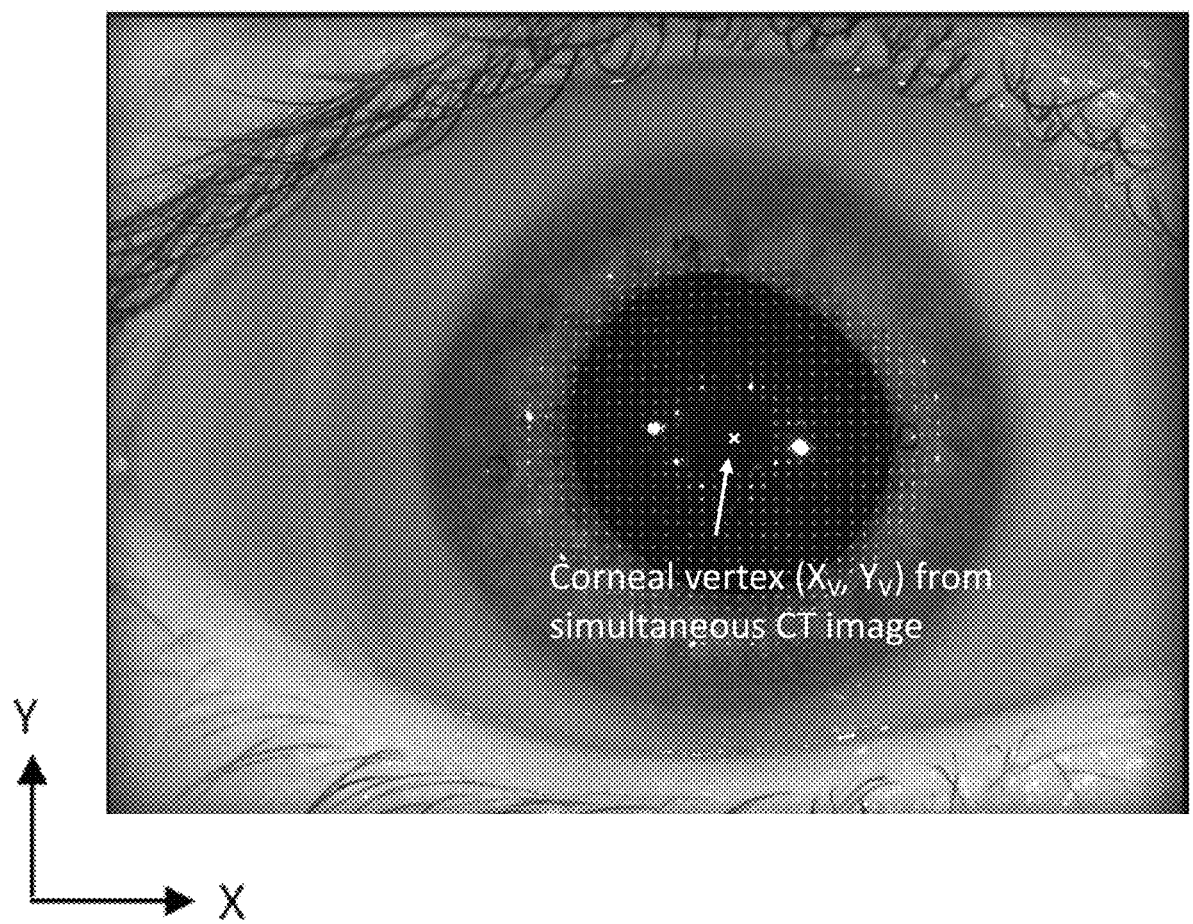
FIG. 27D shows a simultaneous corneal topography (CT) image with marked corneal vertex position, according to the present invention.
Figure 28:
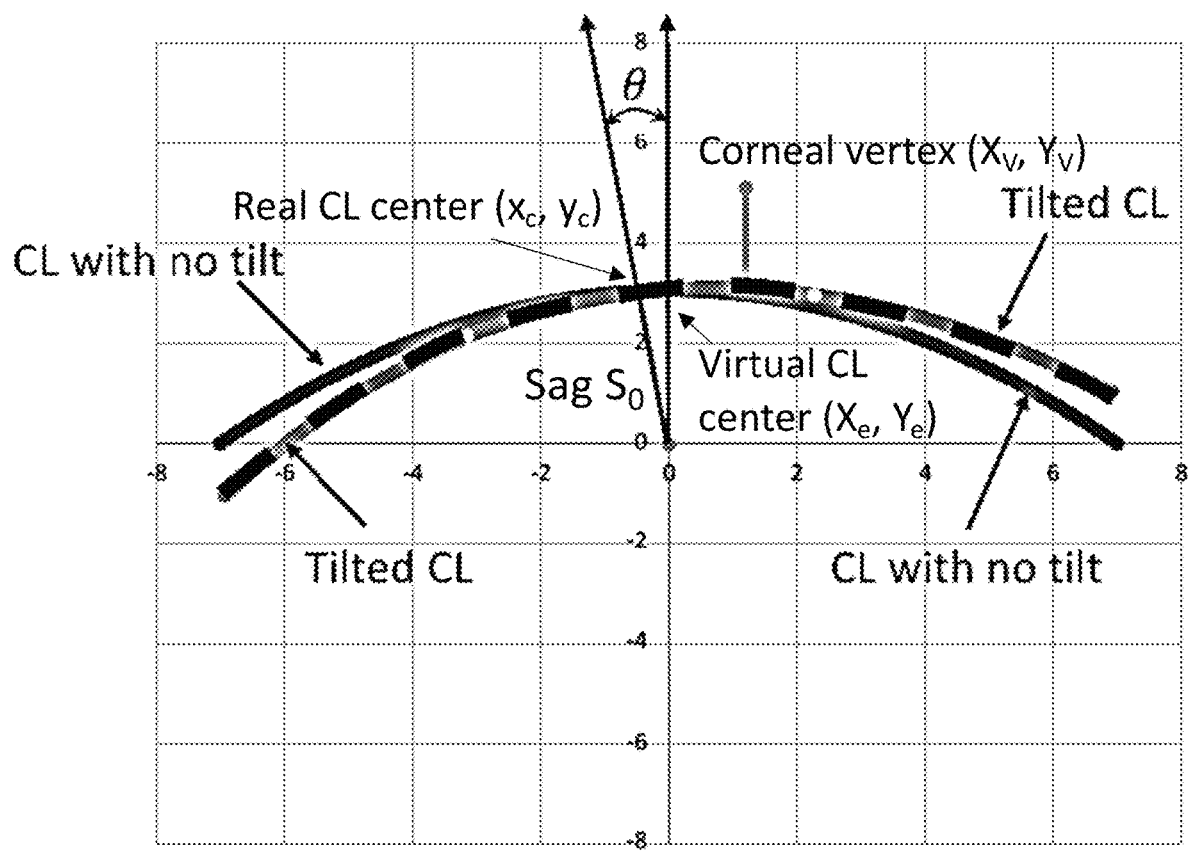
FIG. 28 shows a cross-section view through a CL with and without tilt, according to the present invention.

One embodiment of the present invention is to utilize the patients habitual CLs, which has no fiducials but with embedded marks (to distinguish OD and OS) and calculate the real CL center. This will allow to simplify the WFG CL manufacture process. Due to the unavoidable CL tilt in a patient eye, the center identified by CL edge is not the real CL center:

To demonstrate it, FIGS. 27A-D present two different CL centers: the real one $(X_C, Y_C)$ is obtained by the fiducial marks near the center, and virtual center $(X_e, Y_e)$ is obtained from the edge. When there is no CL tilt, $(X_C, Y_C)$ and $(X_e, Y_e)$ are identical. In common scenarios, they are not and present a slight difference, depending on the amplitude of tilt. FIG. 27A is an IRIS image with usual glints and three fiducial marks that are reasonably near the CL center. FIG. 27B presents three identified fiducial marks and symbol x indicates the real center $(X_C, Y_C)$ calculated by fiducial marks. CL edge with the real center is marked. Slight discrepancy between the edge from the real center and the edge from IRIS camera is presented. FIG. 27D is the simultaneous CT image with highlight corneal vertex $(X_V, Y_V)$ is presented and will be used later for the real CL center calculation with no presence of fiducial marks. FIG. 28 is a cross-section CL view with no tilt, compared to tilt angle $\theta$, to demonstrate these quantities.

This method simplifies the WFG contact lens manufacture by skipping the predicate CL design for the patients with habitual CLs. It brings tremendous convenience to the optometrists and patients, from reducing patient visit frequency, more efficient and less complications.

Figure 30:
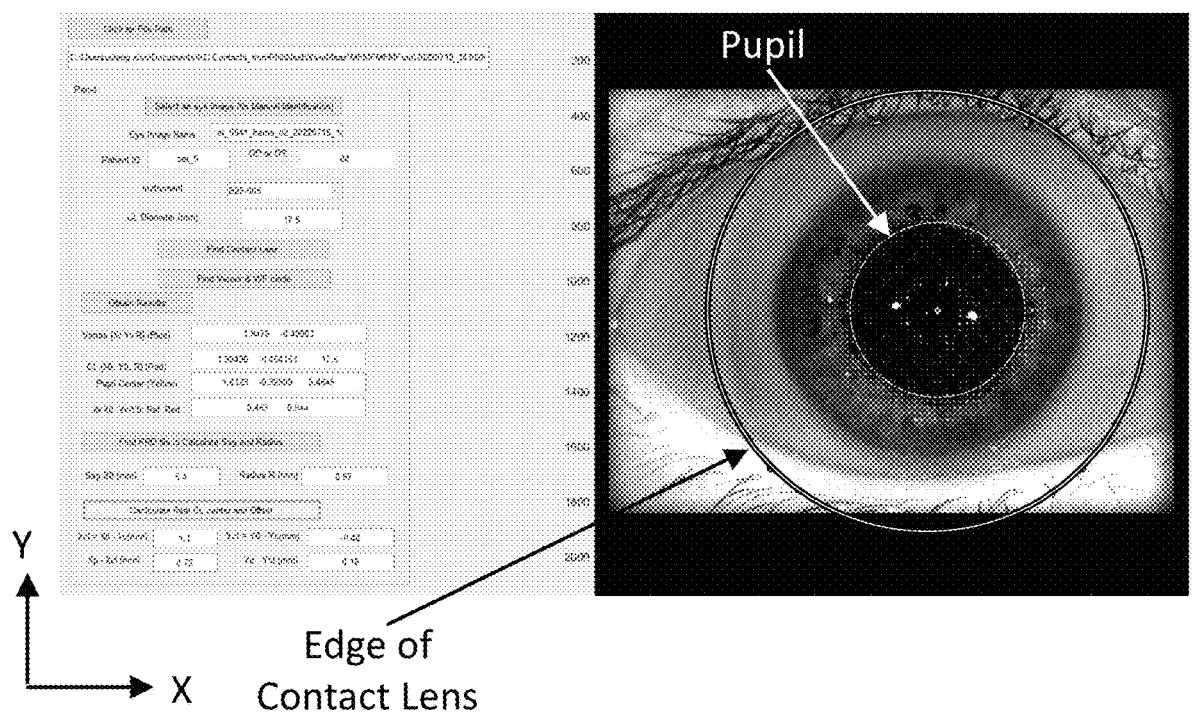
FIG. 30 shows a Graphical User Interface (GUI) of calculating and real CL center without fiducial marks information and offset (from pupil center to real CL center), step by step, according to the present invention.

FIG. 30 shows a GUI that calculates real CL center without fiducial marks and offset $\Delta x$ and $\Delta y$ which horizontal and vertical distance from WFS pupil center to CL real center. The procedure and supported calculations can be summarized as:

Step 1: Select an CT image of the predicate CL measurement that has supported wavefront information (pupil center $(X_P, Y_P)$), and corneal vertex $(X_V, Y_V)$, and predicate lens profile information (radius of curvature $R_0$ and sag $S_0$ etc).

Step 2: Create a circle with specified CL size interactively by moving the center to ensure the circle closely match the CL edge that can be seen. CL edge identified center $(X_e, Y_e)$ is obtained.

Step 3: Obtain positions of vertex $(X_V, Y_V)$, edge identified center $(X_e, Y_e)$, pupil center $(X_P, Y_P)$, and offset between $(X_V, Y_V)$ and $(X_e, Y_e)$, that is, $(X_V-X_e, Y_V-Y_e)$.

Step 4: Extract predicate CL points file information to calculate the sag $(S_0)$ and radius (R). As a result, from Steps 3 and 4, the CL tilt angle in both X and Y components, $\theta_X$ and $\theta_Y$, can be obtained via:

$$\theta_X = \tan^{-1}\left(\frac{X_V - X_e}{R}\right), \quad (1)$$

$$\theta_Y = \tan^{-1}\left(\frac{X_V - X_e}{R}\right), \quad (2)$$

Step 5: Calculate real CL center $(X_C, Y_C)$ and the offset between real CL center and wavefront pupil center $(X_P, Y_P)$:

$$X_C = X_e - S_0 \sin \theta_X, \quad (3)$$

$$Y_c = Y_e - S_0 \sin \theta_Y, \quad (4)$$

There are several ways to make the measurement of the vertex position with the CL on the eye, as follows.

Purkinje Images

In nearly all aberrometer instruments there is a system for visually imaging the iris of the eye. This is the system that is generally used to determine the alignment of the CL on the eye during the measurement through the diagnostic instrument's lens. The illumination of the eye is often made using one or more light sources (usually LEDs) that are arranged around the camera lens. Since the eye and CL are highly curved convex surfaces, there will always be a reflection (glints) from these surfaces that is visible in the camera's visual image. These reflections can be used as a means for finding the position of the surface that is normal to the measurement axis.

Note that this method depends on the exact arrangement of the imaging optical system, and thus the location of the lens normal to the instrument is the center of the LED pattern.

Figure 29:
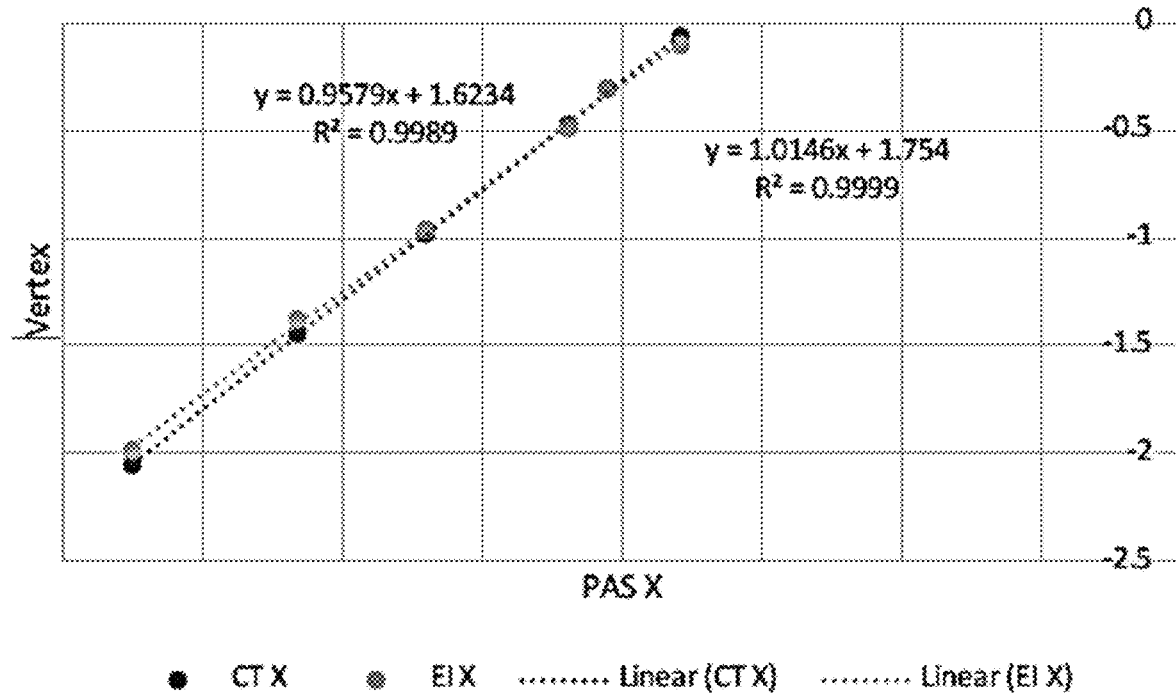
FIG. 29 shows a plot used for vertex calibration, according to the present invention.
Figure 29:
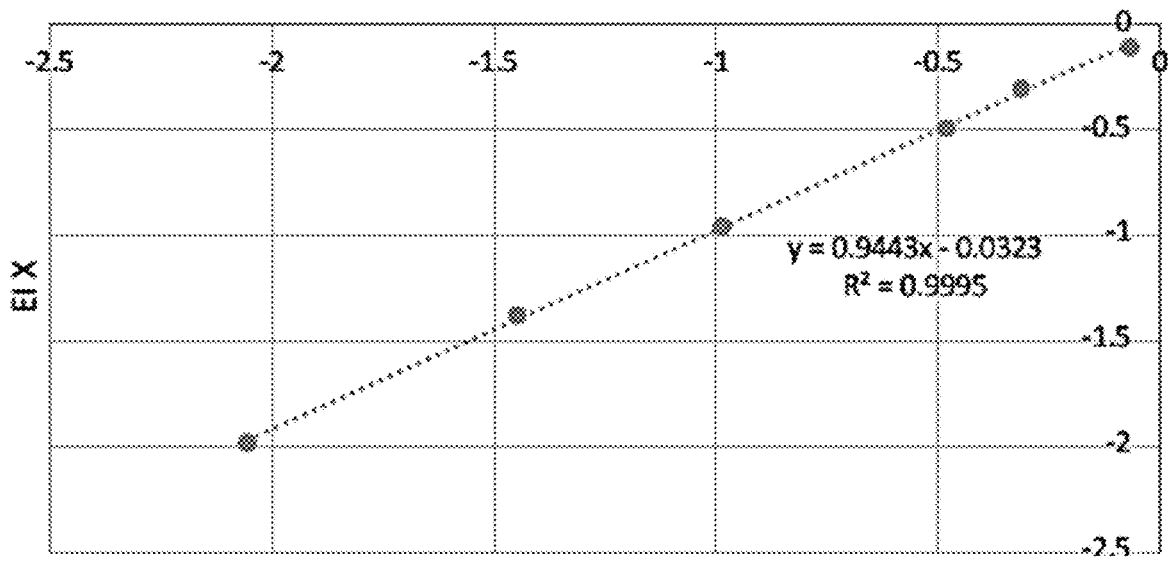

However, as the eye (and hence the cornea) is moved radially away from the optical axis of the imaging system (See FIGS. 31A and 31B) there is an increasing amount of error because the sources reflect off different portions of the spherical cornea. This error is very systematic, and a calibration can be used to make a correction. FIG. 29 shows a calibration for this error with a resulting error of about 5%. The calibration response is very linear and predictable.

When the fiducial marks are located inside a dilated pupil (larger pupil), they might not be able to be detected from this iris image (it is not consistent, sometimes we can, sometimes we cannot). Instead, they can always be easily found in the WFS image.

Corneal Topographer

Figure 31A:
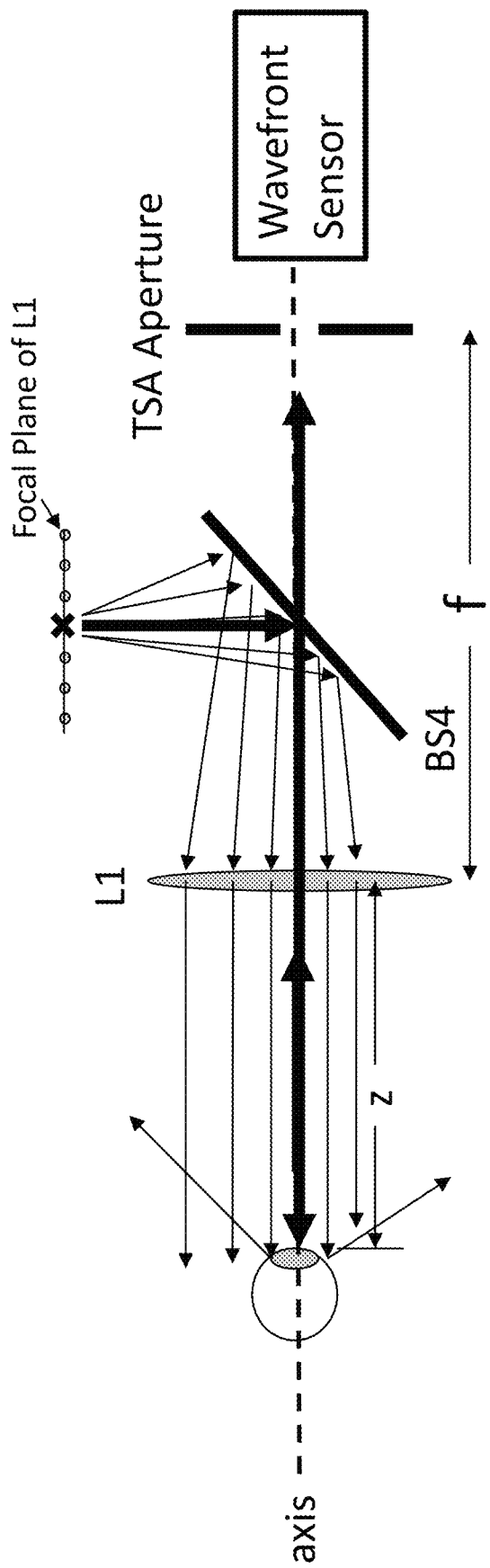
FIG. 31A shows a schematic example of an optical system (wavefront aberrometer) for performing wavefront analysis of an eye, in an aligned configuration, according to the present invention.
Figure 31B:
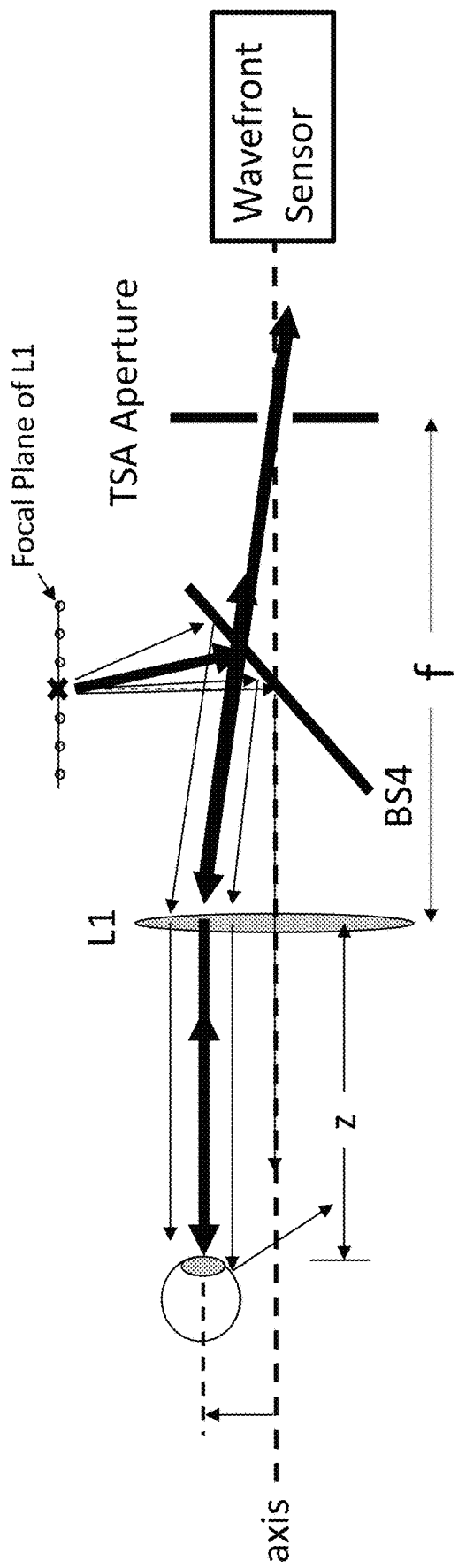
FIG. 31B shows a schematic example of an optical system (wavefront aberrometer) for performing wavefront analysis of an eye, in an mis-aligned configuration, according to the present invention.
Figure 32:
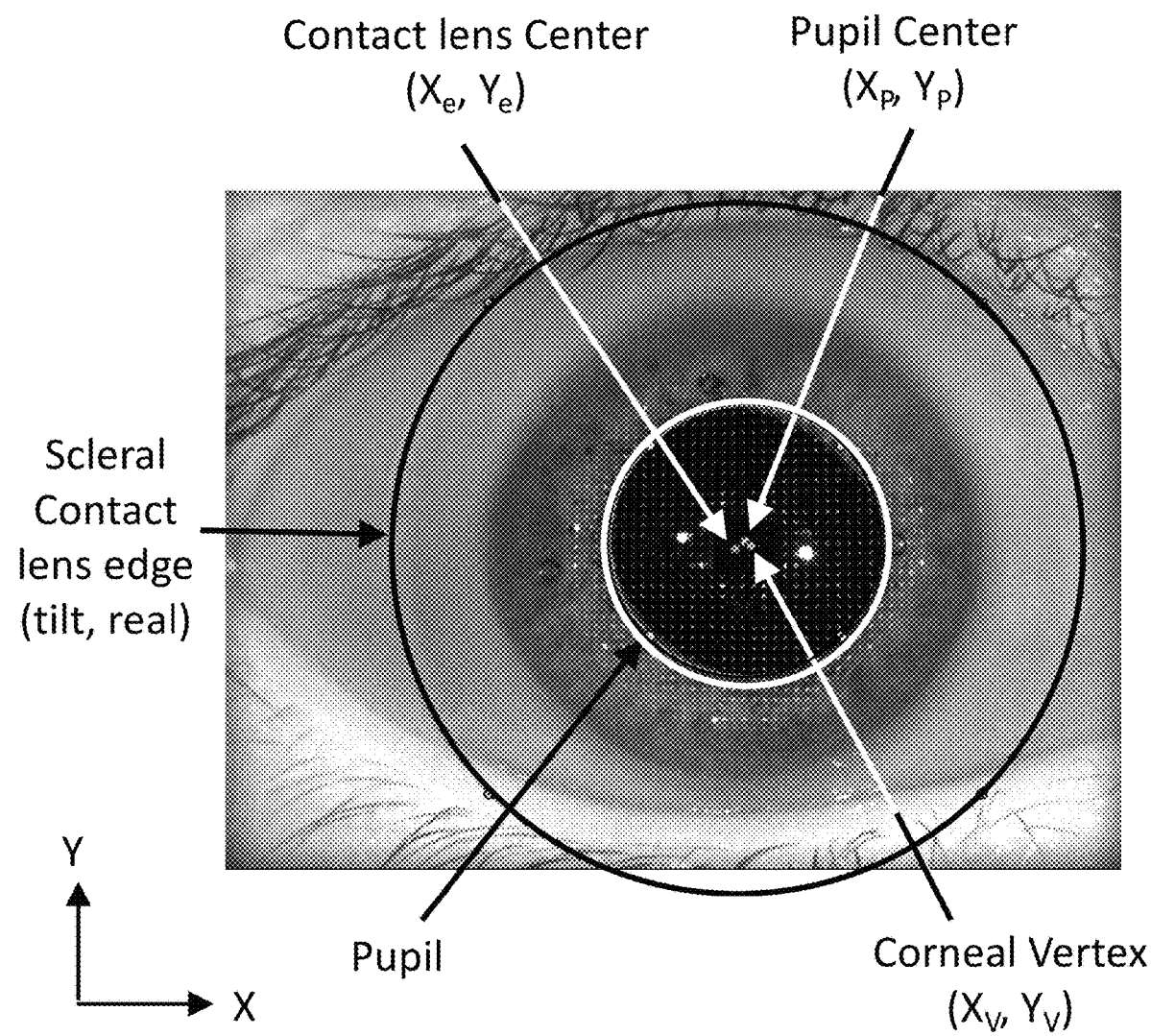
FIG. 32 shows a wavefront sensor image of an eye with a scleral CL, according to the present invention. The CL center, pupil center, and corneal vertex is shown.

In a telecentric topographer, a part of the light is projected through the collecting lens and is arranged with a TSA so that the only rays collected are parallel to the instrument's axis. This is shown in FIGS. 31A and 31B. In this case, the position of the surface that is normal to the instrument optical axis is independent of alignment. Also, in this case, the projected pattern directly determines this normal position and no correction is needed. FIG. 32 is an image from the "telecentric topographer" The optics for this are depicted in FIGS. 31A and 31B. Because of the arrangement of the telecentric stop all rays are parallel in the object space (near the eye). This means that anywhere in the image the reflected central pattern in the image is at the place where the cornea is normal to the optical axis of the instrument. This allows us to use the contact lens edge and the tilt (from FIG. 28) instead of having to add special fiducials. This means that we can use any contact lens as the predicate lens and don't have to add a special step of making a lens with fiducials.

The fiducial marks can comprise recessed dimples filled with ink that absorbs the illumination light.

FIG. 32 shows a wavefront sensor image of an eye with a scleral CL and fiducial marks on the CL, according to the present invention.

Figure 33:
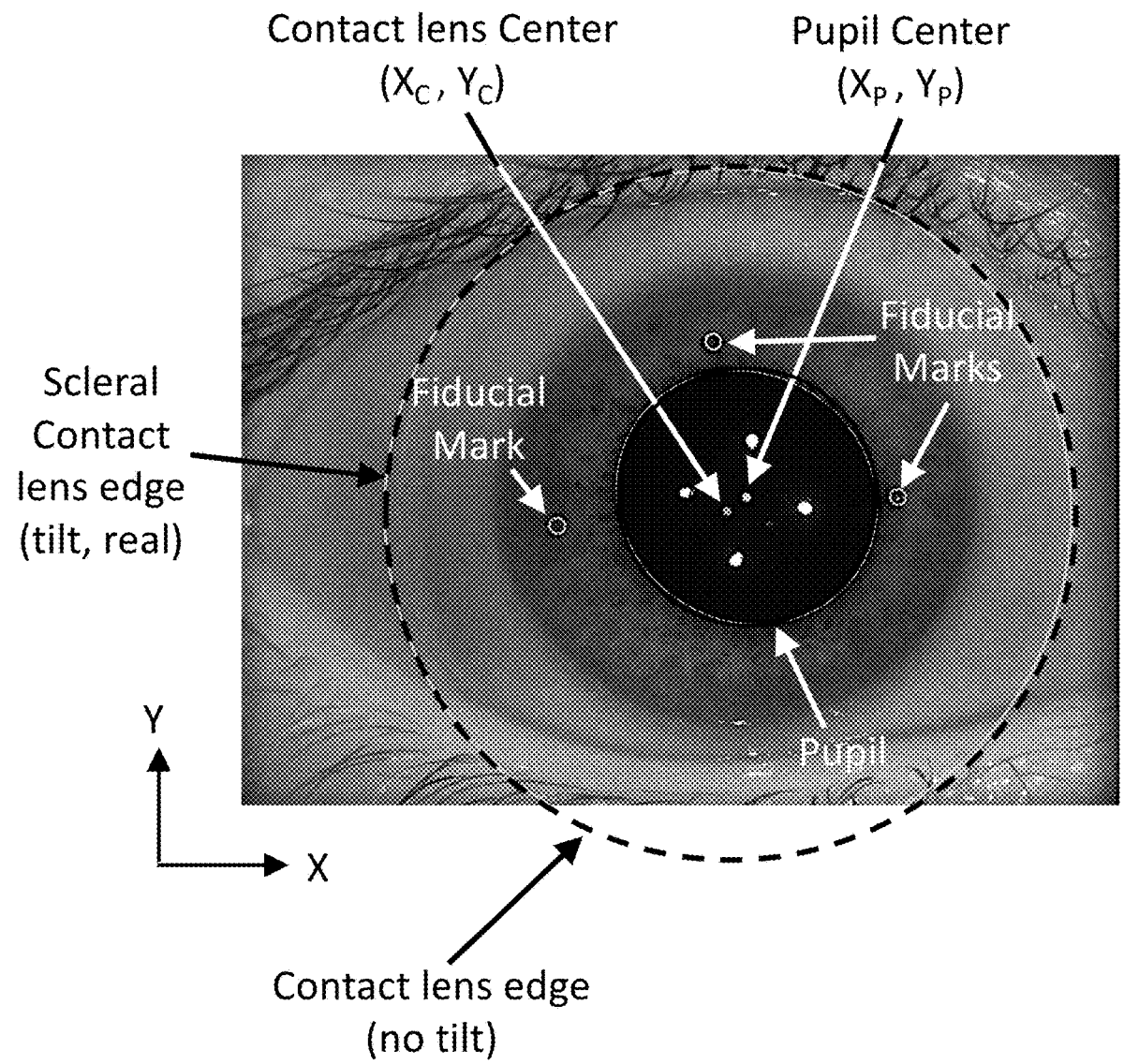
FIG. 33 shows a visual iris image of an eye with a scleral CL and fiducial marks on the CL disposed outside of the pupil, according to the present invention.

FIG. 33 shows a visual iris image of an eye with a scleral CL and fiducial marks on the CL, according to the present invention.

Figure 34A:
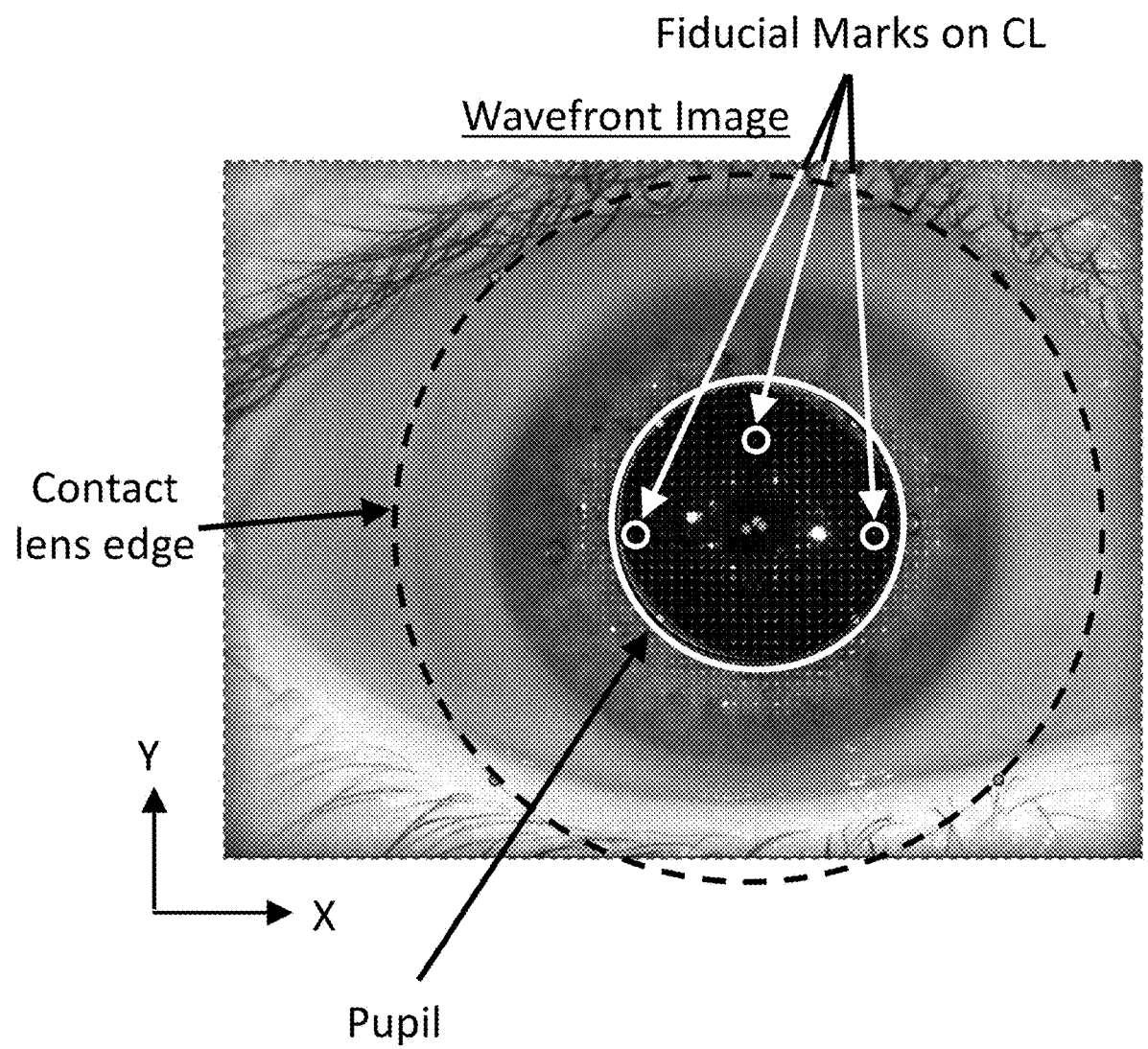
FIG. 34A shows a wavefront sensor image of an eye with a scleral CL and fiducial marks on the CL, disposed inside of the pupil, according to the present invention.

FIG. 34A shows a wavefront sensor image of an eye with a scleral CL and fiducial marks on the CL, according to the present invention.

Figure 34B:
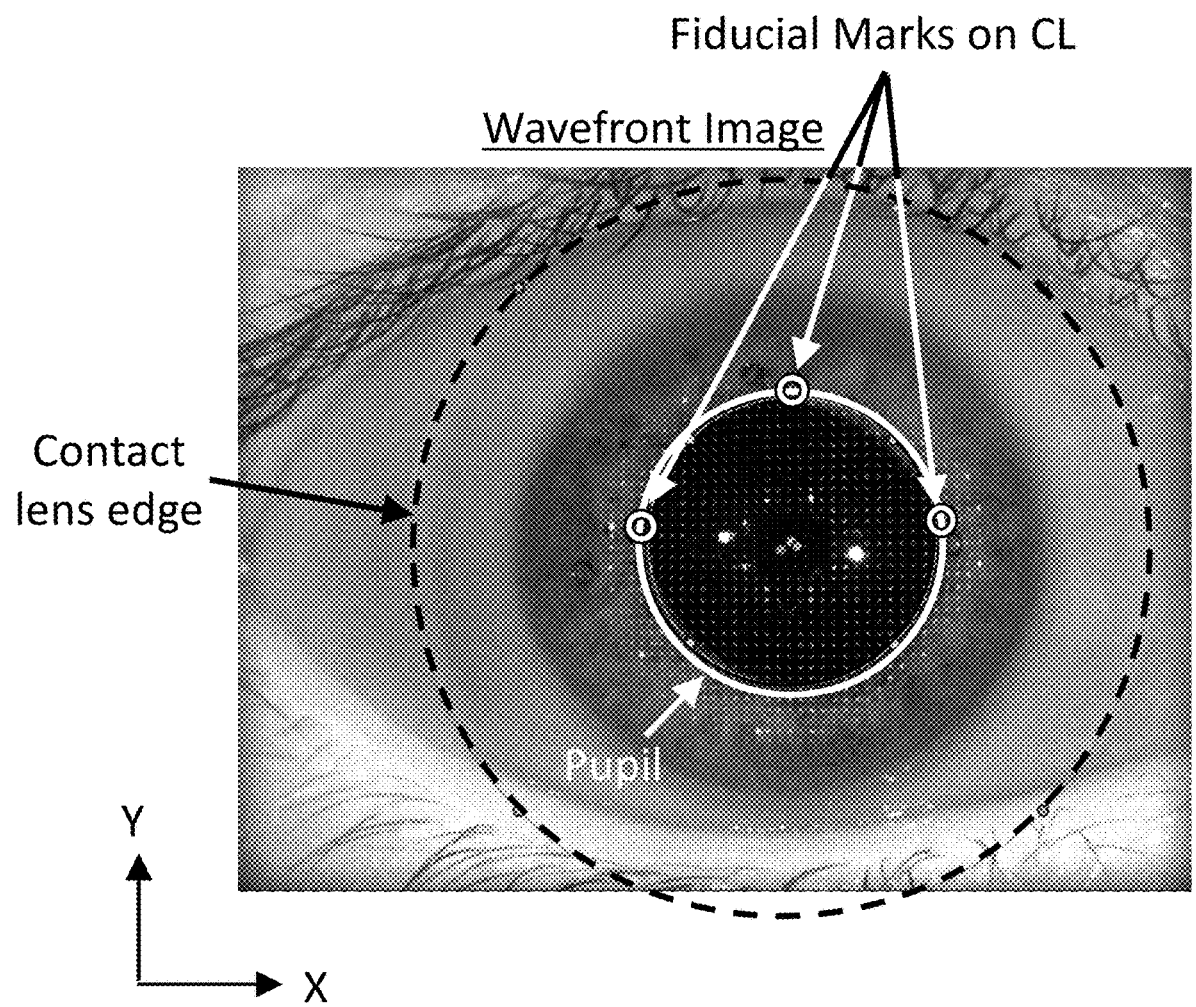
FIG. 34B shows a wavefront sensor image of an eye with a scleral CL and fiducial marks on the CL, disposed on the edge of the pupil, according to the present invention.

FIG. 34B shows a wavefront sensor image of an eye with a scleral CL and fiducial marks on the CL, according to the present invention.

In summary, placing fiducial marks on CLs is part of the known art. However, all of those prior art fiducial marks are disposed outside of the pupil's diameter (in order that the spots don't interfere with the visual acuity). What is new in this invention is the use of fiducial marks that are used in conjunction with a combined optical topographer/aberrometer for prescribing wavefront-corrected CLs, as well as the requirement that the fiducial marks be disposed inside of, or at the outer diameter of, the patient's pupil (so that they can be directly imaged by the optical instrument). The use of the Purkinje images and/or the use of a telecentric topographer to determine lens tilt is also a novel concept. Fiducial marks can also be used to stabilize undesirable rotations of the CL due to eyelid and/or eyeball movement. An optical center is defined that is different from the lens's center. Then, the correction center is moved to match. This would work for both wavefront customized and normal CLs, as the improved centering would help normal CLs even without using wavefront analysis techniques. Incorrect centering would mean that the wavefront correction would be placed in the wrong location on the contact lens because of lens tilt.

We claim:

1. A method of identifying and correcting for any misaligned position and/or misaligned rotation of a contact lens disposed on an eye, comprising:
   (a) determining a prescription of a trial contact lens on an eye by making dynamic measurements of an eye's visual aberrations with a combined optical aberrometer/topographer optical instrument;
   (b) determining an optimal pupil size;
   (c) determining the pupil's center and radius;
   (d) determining an Iris' center and radius;
   (e) determining the contact lens center and radius using predefined fiducial marks on the contact lens;
   (f) performing modal and/or zonal wavefront sensor analysis and calculating Xernike polynomial coefficients that define a family of wavefront aberrations;
   (g) filtering out outliers (blinks);
   (h) generating a 2-D wavefront contour map showing a distribution of wavefront aberrations across the eye;
   (i) converting the 2-D wavefront contour map into a 3D wavefront guided contact lens thickness correction profile; and (j) using the WFG corrected thickness profile to fabricate a wavefront-corrected contact lens by taking into consideration any XY mis-alignment and/or mis-rotation of the contact lens.

2. The method of claim 1, after the prescription has been measured in step (a), repositioning the fiducial marks radially farther out on a wavefront-corrected contact lens, so that they only create dark spots during optical measurements when the pupil is dilated.

* * * * *